United States Patent
Peng et al.

(10) Patent No.: US 8,524,793 B2
(45) Date of Patent: Sep. 3, 2013

(54) INTERPOLYMER COMPOSITIONS OF ETHYLENE, α-OLEFIN AND NONCONJUGATED POLYENE, METHODS OF MAKING THE SAME, AND FOAM AND ARTICLES PREPARED FROM THE SAME

(75) Inventors: Shuwen Peng, Shanghai (CN); Wenbin Liang, Pearland, TX (US); Stephen Y. Cheng, Sheung Shui (CN); Peter X. Lin, Shanghai (CN); Shih-Yaw Lai, Marlboro, NJ (US)

(73) Assignee: Dow Global Technologies, LLC, Midland, MI (US)

( * ) Notice: Subject to any disclaimer, the term of this patent is extended or adjusted under 35 U.S.C. 154(b) by 231 days.

(21) Appl. No.: 12/937,827

(22) PCT Filed: Jun. 18, 2009

(86) PCT No.: PCT/CN2009/072331
§ 371 (c)(1),
(2), (4) Date: Oct. 14, 2010

(87) PCT Pub. No.: WO2009/152772
PCT Pub. Date: Dec. 23, 2009

(65) Prior Publication Data
US 2011/0034577 A1 Feb. 10, 2011

(30) Foreign Application Priority Data
Jun. 18, 2008 (WO) ............... PCT/CN2008/001186

(51) Int. Cl.
*C08L 23/08* (2006.01)
*C08J 9/00* (2006.01)

(52) U.S. Cl.
USPC ........................... 521/140; 525/191; 526/335

(58) Field of Classification Search
USPC ....................................................... 521/140
See application file for complete search history.

(56) References Cited

U.S. PATENT DOCUMENTS

| 3,645,992 A | 2/1972 | Elston |
| 4,722,971 A | 2/1988 | Datta et al. |

(Continued)

FOREIGN PATENT DOCUMENTS

| EP | 0718362 | 6/1996 |
| EP | 775726 A1 | 5/1997 |

(Continued)

OTHER PUBLICATIONS

Noordermeer, J.W.M. 2002. Ethylene-Propylene Elastomers: Encyclopedia of Polymer Science and Technology. vol. 6, pp. 178-196.*

(Continued)

*Primary Examiner* — Randy Gulakowski
*Assistant Examiner* — Christina Wales (57) ABSTRACT

A composition comprising at least the following:
A) an interpolymer comprising, in polymerized form, ethylene, an α-olefin and a nonconjugated polyene, and wherein the interpolymer comprises less than, or equal to, 5 weight percent of the polyene, based on the total amount of polymerized monomers, and wherein the interpolymer has a molecular weight distribution ($M_w/M_n$) less than 3;
B) an interpolymer comprising, in polymerized form, ethylene, an α-olefin and a nonconjugated polyene, and wherein the interpolymer comprises greater than, or equal to, 5 weight percent of the polyene, based on the total amount of polymerized monomer; and wherein the total polyene content is less than 7 weight percent.

15 Claims, 1 Drawing Sheet

(56) References Cited

U.S. PATENT DOCUMENTS

| | | | |
|---|---|---|---|
| 4,866,101 | A | 9/1989 | Iwasa et al. |
| 4,882,386 | A | 11/1989 | Stella |
| 5,041,584 | A | 8/1991 | Crapo et al. |
| 5,191,042 | A | 3/1993 | Cozewith |
| 5,229,478 | A | 7/1993 | Floyd et al. |
| 5,242,971 | A | 9/1993 | Nakahama et al. |
| 5,272,236 | A | 12/1993 | Lai et al. |
| 5,278,272 | A | 1/1994 | Lai et al. |
| 5,314,752 | A | 5/1994 | Bova et al. |
| 5,362,787 | A | 11/1994 | Ngoc et al. |
| 5,563,217 | A * | 10/1996 | Davis et al. .................. 525/194 |
| 5,610,254 | A | 3/1997 | Sagane et al. |
| 5,973,017 | A | 10/1999 | Okita et al. |
| 6,040,351 | A | 3/2000 | Okita et al. |
| 6,153,704 | A | 11/2000 | Kodama et al. |
| 6,300,451 | B1 | 10/2001 | Mehta et al. |
| 6,325,956 | B2 | 12/2001 | Chaudhary et al. |
| 6,329,439 | B1 | 12/2001 | Peterson et al. |
| 6,410,650 | B1 | 6/2002 | Koda et al. |
| 6,458,894 | B1 | 10/2002 | Kawasaki et al. |
| 6,531,546 | B2 | 3/2003 | Oka et al. |
| 6,599,984 | B1 | 7/2003 | Kawasaki et al. |
| 6,635,727 | B1 | 10/2003 | Koda et al. |
| 6,777,498 | B2 | 8/2004 | Imai et al. |
| 6,841,582 | B2 | 1/2005 | Morikawa et al. |
| 7,135,216 | B2 | 11/2006 | Tsujiguchi et al. |
| 7,999,879 | B2 | 8/2011 | Yoshida et al. |
| 2004/0077793 | A1* | 4/2004 | Dees et al. .................. 525/240 |
| 2006/0009567 | A1 | 1/2006 | Guillot et al. |

FOREIGN PATENT DOCUMENTS

| | | |
|---|---|---|
| EP | 1183286 A1 | 3/2002 |
| JP | 8283481 A | 10/1996 |
| JP | 10139937 A | 5/1998 |
| JP | 10175440 A | 6/1998 |
| JP | 2005263842 | 3/2004 |
| JP | 2004263014 | 9/2004 |
| JP | 2005097478 | 4/2005 |
| JP | 2005120335 | 5/2005 |
| WO | 0069930 | 11/2000 |
| WO | 03059963 A1 | 7/2003 |

OTHER PUBLICATIONS

Noordermeer, J.W.M. "Recent Advances in Sponge Techonology of EPDM-Rubber in Automotive Weatherstrips: A review". Cellular Polymers, 16, pp. 331-348. 1997.*

Franck, A.J. "Understanding Rheology of Thermoplastic Polymers" T.A. Instruments. 2004.*

* cited by examiner

FIGURE 1

FIGURE 2

INTERPOLYMER COMPOSITIONS OF ETHYLENE, α-OLEFIN AND NONCONJUGATED POLYENE, METHODS OF MAKING THE SAME, AND FOAM AND ARTICLES PREPARED FROM THE SAME

REFERENCE TO RELATED APPLICATIONS

The present application claims the benefit of International Application No. PCT/CN2008/001186, filed on Jun. 18, 2008, fully incorporated herein by reference.

BACKGROUND OF THE INVENTION

In the manufacturer of crosslinked foamed profiles, a foam formulation with a fast cure rate helps to control pore size. A high cure rate also helps to achieve a fast crosslinking of the skin of the profile, and for the formation of a foam with small pores sizes (lower than 500 microns). To achieve these results, conventional practice uses EPDM grades with 5-ethylidenenorbornene (ENB) levels above 7.5 weight percent. However, high levels of ENB increase the cost of the interpolymer, since the ENB is an expensive raw material. In addition, interpolymers containing high levels of ENB result foam formulations with short scorch time, which leads to processing problems.

There is a need for EPDM-based formulations, which contain relatively lower levels of ENB, and which have cure rates similar to formulations containing higher ENB interpolymers. There is a further need for crosslinked foams that can be formed from formulations that have longer scorch times. These needs and others have been met by the following invention.

SUMMARY OF THE INVENTION

The invention provides a composition comprising at least the following:

A) from "greater than zero" to "less than 100" phr (based on sum weight of Components A and B) of an interpolymer comprising, in polymerized form, ethylene, an α-olefin and a nonconjugated polyene, and wherein the interpolymer comprises less than, or equal to, 5 weight percent of the polyene, based on the total amount of polymerized monomers, and wherein the interpolymer has a molecular weight distribution $(M_w/M_n)$ less than 3;

B) from "less than 100" to "greater than zero" phr (based on sum weight of Components A and B) of an interpolymer comprising, in polymerized form, ethylene, an α-olefin and a nonconjugated polyene, and wherein the interpolymer comprises greater than, or equal to, 5 weight percent of the polyene, based on the total amount of polymerized monomer; and wherein the total polyene content is less than 7 weight percent (based on the total amount of polymerized monomers in the interpolymers of Components A and B).

DETAILED DESCRIPTION OF THE INVENTION

For the manufacturing of low density high performance EPDM foams (sponge), higher double-bond content is generally required (greater than, or equal to, 7.5 weight percent ENB, based on total amount of polymerized monomers) for faster curing which would lead to smooth surface after foaming and curing. However, it has been discovered that compositions with low total ENB EPDM (with total ENB of less than 7 weight percent, based on total amount of polymerized monomers) can be used to for sponge and other foamable articles. The foamable articles can be made via extrusion, compression and other molding processing.

As discussed above, the invention provides a composition comprising at least the following:

A) from "greater than zero" to "less than 100" phr (based on sum weight of Components A and B) of an interpolymer comprising, in polymerized form, ethylene, an α-olefin and a nonconjugated polyene, and wherein the interpolymer comprises less than, or equal to, 5 weight percent of the polyene, based on the total amount of polymerized monomers, and wherein the interpolymer has a molecular weight distribution $(M_w/M_n)$ less than 3;

B) from "less than 100" to "greater than zero" phr (based on sum weight of Components A and B) of an interpolymer comprising, in polymerized form, ethylene, an α-olefin and a nonconjugated polyene, and wherein the interpolymer comprises greater than, or equal to, 5 weight percent of the polyene, based on the total amount of polymerized monomer; and wherein the total polyene content is less than 7 weight percent (based on the total amount of polymerized monomers in the interpolymers of Components A and B).

The sum weight of Components A and B is typically normalized to 100 weight parts.

In one embodiment, the total polyene content is less than, or equal to, 6.5 weight percent (based on the total amount of polymerized monomers in the interpolymers of Components A and B).

In one embodiment, the interpolymer of Component B comprises from 5 to 8 weight percent of the polyene, based on the total amount of polymerized monomers.

In one embodiment, the interpolymer of Component B comprises from 5.5 to 8 weight percent of the polyene, based on the total amount of polymerized monomers.

In one embodiment, the interpolymer of Component B comprises from 6 to 8 weight percent of the polyene, based on the total amount of polymerized monomers.

In one embodiment, the interpolymer of Component B comprises from 7 to 8 weight percent of the polyene, based on the total amount of polymerized monomers.

In one embodiment, the interpolymer of Component B comprises greater than, or equal to, 7 weight percent of the polyene, based on the total amount of polymerized monomers.

In one embodiment, the interpolymer of Component B comprises greater than, or equal to, 7.2 weight percent of the polyene, based on the total amount of polymerized monomers.

In one embodiment, the interpolymer of Component A comprises less than 5 weight percent of the polyene, based on the total amount of polymerized monomers.

In one embodiment, total polyene content is less than 6 weight percent (based on the total amount of polymerized monomers in the interpolymers of Components A and B).

In one embodiment, total polyene content is less than 5 weight percent (based on the total amount of polymerized monomers in the interpolymers of Components A and B).

In one embodiment, Component A is present in an amount from 1 to 99 phr, and Component B is present in an amount from 99 to 1 phr, each phr based on the sum weight of Components A and B.

In one embodiment, Component A is present in an amount from 10 to 90 phr, and Component B is present in an amount from 90 to 10 phr, each phr based on the sum weight of Components A and B.

In one embodiment, Component A is present in an amount from 20 to 80 phr, and Component B is present in an amount from 80 to 20 phr, each phr based on the sum weight of Components A and B.

In one embodiment, Component A is present in an amount from 20 to 70 phr, and Component B is present in an amount from 80 to 30 phr, each phr based on the sum weight of Components A and B.

In one embodiment, Component A is present in an amount from 40 to 70 phr, and Component B is present in an amount from 60 to 30 phr, each phr based on the sum weight of Components A and B.

In one embodiment, Component A is present in an amount from 40 to 90 phr, preferably from 50 to 80 phr, and more preferably from 55 to 75 phr, based on the sum weight of Components A and B.

In one embodiment, Component B is present in an amount from 10 to 60 phr, preferably from 20 to 50 phr, and more preferably from 25 to 45 phr, based on the sum weight of Components A and B.

In one embodiment, the composition further comprises at least one additive selected from fillers, crosslinking agents, foaming agents, or combinations thereof.

In one embodiment, the composition further comprises at least one additive selected from carbon black, an inorganic filler, an oil, a foaming agent, sulfur, an accelerator, zinc oxide, or combinations thereof.

In one embodiment, the composition comprises from 30 to 150 phr carbon black, 0 to 100 phr organic filler, 30 to 90 phr oil, 3 to 7 phr foaming agent, 3 to 7 phr sulfur, and 3 to 7 phr accelerator.

In one embodiment, the composition comprises from 50 to 100 phr carbon black, 20 to 50 phr organic filler, 40 to 80 phr oil, 1 to 3 phr foaming agent, 1 to 3 phr sulfur, 1 to 3 phr accelerator, and 3 to 7 phr zinc stearate.

In one embodiment, the composition further comprising at least one additive selected from silica; clay; titanium dioxide; silicates of aluminum, magnesium, calcium, sodium, potassium and mixtures thereof; carbonates of calcium, magnesium and mixtures thereof; oxides of silicon, calcium, zinc, iron, titanium, and aluminum; sulfates of calcium, barium, and lead; alumina trihydrate; magnesium hydroxide; or combinations thereof.

In one embodiment, the interpolymer of Component A has a molecular weight distribution, $M_w/M_n$, less than 2.9, preferably, less than, or equal to, 2.8.

In one embodiment, the interpolymer of Component A has a branching index ratio, $M_{z(abs)}/M_z$, less than, or equal to, 1.4, preferably less than, or equal to, 1.3.

In one embodiment, the interpolymer of Component A has a molecular weight ratio, $M_{z(abs)}/M_w$, less than, or equal to, 3.1, preferably less than, or equal to, 2.8, more preferably less than, or equal to, 2.5.

In one embodiment, the interpolymer of Component B has a branching index ratio, $M_{z(abs)}/M_z$, less than, or equal to, 1.5.

In one embodiment, the interpolymer of Component A comprises greater than 2 weight percent of the polyene, preferably greater than 3 weight percent of the polyene, based on the total weight of polymerized monomers.

In one embodiment, the interpolymer of Component A has a Mooney viscosity (ML 1+4 at 125° C.) greater than 70, preferably greater than 80, and more preferably greater than 90.

In one embodiment, the interpolymer of Component A has a Mooney viscosity (ML 1+4 at 125° C.) less than 300, preferably less than 240, more preferably less than 200, and even more preferably less than 160.

In one embodiment, the interpolymer of Component B has a Mooney viscosity (ML 1+4 at 125° C.) less than 100, preferably less than 80, more preferably less than 70.

In one embodiment, the interpolymer of Component B has a Mooney viscosity (ML 1+4 at 125° C.) greater than 40, preferably greater than 50, more preferably greater than 60.

In one embodiment, the weight ratio of the polyenes in the interpolymers of Components A and B (polyene(A)/polyene(B)) is less than, or equal to, 0.8, preferably less than, or equal to, 0.75.

In one embodiment, the difference (absolute) in the amount of polyene in Component B and Component A is greater than 0.5, preferably greater than 1.0 and more preferably greater than 2.0 weight percent.

In one embodiment, the difference (absolute) in the amount of polyene in Component B and Component A is less than 5.0, preferably less than 4.0 and more preferably less than 3.1 weight percent.

In one embodiment, the interpolymer of Component B comprises less than 7.5 weight percent of the polyene, based on the total amount of polymerized monomers.

In one embodiment, the interpolymer of Component B comprises less than 7 weight percent of the polyene, based on the total amount of polymerized monomers.

In one embodiment, the polyene of the interpolymer of Component A is selected from 5-ethylidene-2-norbornene (ENB), dicyclopentadiene or 1,4-hexadiene. In a further embodiment, the polyene is ENB.

In one embodiment, the polyene of the interpolymer of Component B is selected from 5-ethylidene-2-norbornene, dicyclopentadiene or 1,4-hexadiene. In a further embodiment, the polyene of is ENB.

In one embodiment, the weight ratio of ethylene to α-olefin in the interpolymer of Component A is less than 2.5. In a further embodiment, the α-olefin is propylene.

In one embodiment, the weight ratio of ethylene to α-olefin in the interpolymer of Component A is less than 2.0. In a further embodiment, the α-olefin is propylene.

In one embodiment, the weight ratio of ethylene to α-olefin in the interpolymer of Component A is less than 1.5. In a further embodiment, the α-olefin is propylene.

In one embodiment, the weight ratio of ethylene to α-olefin in the interpolymer of Component A is greater than 1.0. In a further embodiment, the α-olefin is propylene.

In one embodiment, the weight ratio of ethylene to α-olefin in the interpolymer of Component A is greater than 1.1. In a further embodiment, the α-olefin is propylene.

In one embodiment, the weight ratio of ethylene to α-olefin in the interpolymer of Component A is greater than 1.2. In a further embodiment, the α-olefin is propylene.

In one embodiment, the α-olefin of the interpolymer of Component A is propylene.

In one embodiment, the weight ratio of ethylene to α-olefin in the interpolymer of Component B is less than 2.5.

In one embodiment, the α-olefin of the interpolymer of Component B is propylene.

In one embodiment, the interpolymer of Component A has a weight average molecular weight, $M_w$ greater than 156,000 g/mole.

In one embodiment, the interpolymer of Component A comprises a majority amount of the ethylene, based on the total weight of polymerized monomers.

In one embodiment, the interpolymer of Component A comprises a majority molar amount of the ethylene, based on the total moles of polymerized monomers.

In one embodiment, the interpolymer of Component A comprises greater than, or equal to, 40 weight percent, preferably greater than, or equal to, 45 weight percent, and more preferably greater than, or equal to, 50 weight percent of polymerized ethylene, based on the total weight of polymerized monomers.

In one embodiment, the interpolymer of Component A comprises greater than, or equal to, 51 weight percent, preferably greater than, or equal to, 55, more preferably greater than, or equal to, 60 weight percent of polymerized ethylene, based on the total weight of polymerized monomers.

In one embodiment, the interpolymer of Component A comprises less than, or equal to, 73 weight percent, preferably less than, or equal to, 67 weight percent, and more preferably less than, or equal to, 62 weight percent of polymerized ethylene, based on the total weight of polymerized monomers.

In one embodiment, the interpolymer of Component A has ethylene content from 45 weight percent to 95 weight percent, based on the total weight of polymerized monomers, preferably from 50 weight percent to 85 weight percent, based on the total weight of polymerized monomers.

In one embodiment, the interpolymer of Component B comprises a majority weight amount of the ethylene, based on the total weight of polymerized monomers.

In one embodiment, the interpolymer of Component B comprises a majority molar amount of the ethylene, based on the total moles of polymerized monomers.

In one embodiment, the interpolymer of Component B comprises greater than, or equal to, 40 weight percent, preferably greater than, or equal to, 45 weight percent, and more preferably greater than, or equal to, 50 weight percent of polymerized ethylene, based on the total weight of polymerized monomers.

In one embodiment, the interpolymer of Component B comprises greater than, or equal to, 51 weight percent, preferably greater than, or equal to, 55, more preferably greater than, or equal to, 60 weight percent of polymerized ethylene, based on the total weight of polymerized monomers.

In one embodiment, the interpolymer of Component B comprises less than, or equal to, 73 weight percent, preferably less than, or equal to, 67 weight percent, and more preferably less than, or equal to, 62 weight percent of polymerized ethylene, based on the total weight of polymerized monomers.

In one embodiment, the interpolymer of Component B has ethylene content from 50 weight percent to 70 weight percent, based on the total weight of polymerized monomers.

In a preferred embodiment, the polyene of the interpolymer of Component A is a nonconjugated diene. In a further embodiment, the interpolymer is an ethylene/α-olefin/diene interpolymer. In yet a further embodiment, the interpolymer of Component A is an ethylene/α-olefin/diene terpolymer.

In one embodiment, the α-olefin of the interpolymer of Component A is propylene.

In one embodiment, the polyene of the interpolymer of Component A is 5-ethylidene-2-norbornene (ENB).

In a preferred embodiment, the polyene of the interpolymer of Component B is a nonconjugated diene. In a further embodiment, the interpolymer is an ethylene/α-olefin/diene interpolymer. In yet a further embodiment, the interpolymer of Component B is an ethylene/α-olefin/diene terpolymer.

In one embodiment, the α-olefin of the interpolymer of Component B is propylene.

In one embodiment, the polyene of the interpolymer of Component B is 5-ethylidene-2-norbornene (ENB).

In one embodiment, the interpolymer of Component A is a homogeneously branched linear interpolymer or a homogeneously branched substantially linear interpolymer.

In one embodiment, the interpolymer of Component B is a homogeneously branched linear interpolymer or a homogeneously branched substantially linear interpolymer.

In one embodiment, the interpolymer of Component A is in the form of granular particles.

In one embodiment, the interpolymer of Component A is polymerized in the gas phase in the presence of a partitioning agent. In a further embodiment, the partitioning agent is carbon black.

In one embodiment, the interpolymer is made up of particles comprising a predominantly polymer core, which is surrounded by a coating containing predominantly partitioning agent. In a further embodiment, the partitioning agent is carbon black.

In one embodiment, the sum weight of the interpolymer of Component A and the interpolymer of Component B is present in an amount greater than, or equal to, 50 weight percent, preferably greater than, or equal to, 60 weight percent, and more preferably greater than, or equal to, 70 weight percent, based on the total weight of the polymer components of the composition.

In one embodiment, the sum weight of the interpolymer of Component A and the interpolymer of Component B is present in an amount greater than, or equal to, 50 weight percent, preferably greater than, or equal to, 60 weight percent, and more preferably greater than, or equal to, 70 weight percent, based on the total weight of the composition.

In one embodiment, the sum weight of the interpolymer of Component A and the interpolymer of Component B is present in an amount greater than, or equal to, 75 weight percent, preferably greater than, or equal to, 80 weight percent, and more preferably greater than, or equal to, 85 weight percent, based on the total weight of the polymer components of the composition.

In one embodiment, the sum weight of the interpolymer of Component A and the interpolymer of Component B is present in an amount greater than, or equal to, 75 weight percent, preferably greater than, or equal to, 80 weight percent, and more preferably greater than, or equal to, 85 weight percent, based on the total weight of the composition.

In one embodiment, the interpolymer of Component A does not comprise a triene.

In one embodiment, the interpolymer of Component B does not comprise a triene.

In one embodiment, the composition does not comprise a halogenated polymer.

In one embodiment, the composition does not comprise a phenol resin.

In a preferred embodiment, the interpolymer of Component A is an ethylene/α-olefin/diene interpolymer. In a further embodiment, the α-olefin is propylene. In a further embodiment, the diene is ENB.

In a preferred embodiment, the interpolymer of Component B is an ethylene/α-olefin/diene interpolymer. In a further embodiment, the α-olefin is propylene. In a further embodiment, the diene is ENB.

An inventive composition may have a combination of two or more embodiments as described herein.

The interpolymer of Component A may have a combination of two or more embodiments as described herein.

The interpolymer of Component B may have a combination of two or more embodiments as described herein.

The invention also provides a foam formed from an inventive composition.

In one embodiment, the foam has pore sizes ranging from 50 microns to 280 micron, preferably from 60 microns to 240 microns.

In one embodiment, the foam has an average pore size from 120 to 180 microns. In one embodiment, the foam has an average pore size from 130 to 170 microns.

In one embodiment, the foam has a maximum pore size less than, or equal to, 280 microns, preferably less than, or equal to, 260 microns.

In one embodiment, the foam has a density from 0.4 to 0.8 g/cm$^3$.

In one embodiment, the foam has a density from 0.55 to 0.8 g/cm$^3$.

An inventive foam may have a combination of two or more embodiments as described herein.

The invention also provides an article comprising at least one component formed from the an inventive foam.

In one embodiment, the article is a sponge. In another embodiment, the article is in an automotive part. In another embodiment, the article is a building or construction material.

The invention also provides an article, comprising at least one component formed from an inventive composition.

In one embodiment, the article is a sponge. In another embodiment, the article is in an automotive part. In another embodiment, the article is a building or construction material.

An inventive article may have a combination of two or more embodiments as described herein.

The invention also provides a method of making a polymeric foam, said method comprising foaming and crosslinking an inventive composition.

An inventive method may have a combination of two or more embodiments as described herein.

Ethylene/α-Olefin/Polyene Interpolymers

In one embodiment, the ethylene/α-olefin/nonconjugated polyene interpolymers of the present invention have polymerized therein C2 (ethylene), at least one C3-C20 α-olefin (ethylenically unsaturated) monomer, and, typically, a C4-C40 nonconjugated polyene. The α-olefin may be either an aliphatic or an aromatic compound, and may contain vinylic unsaturation or a cyclic compound, such as styrene, p-methyl styrene, cyclobutene, cyclopentene, and norbornene, including norbornene substituted in the 5 and 6 position with C1-C20 hydrocarbyl groups.

The α-olefin is preferably a C3-C20 aliphatic compound, preferably a C3-C16 aliphatic compound, and more preferably a C3-C10 aliphatic compound. Preferred ethylenically unsaturated monomers include 4-vinylcyclohexene, vinylcyclohexane, and C3-C10 aliphatic α-olefins (especially propylene, isobutylene, 1-butene, 1-pentene, 1-hexene, 3-methyl-1-pentene, 4-methyl-1-pentene, 1-octene, 1-decene and 1-dodecene). A more preferred C3-C10 aliphatic α-olefin is selected from the group consisting of propylene, 1-butene, 1-hexene and 1-octene, and more preferably propylene. In a preferred embodiment, the interpolymer is an EPDM interpolymer. In a further embodiment, the diene is 5-ethylidene-2-norbornene (ENB).

In another embodiment, each interpolymer is used in a dry form, without an oil extender. In another embodiment, each interpolymer is an EPDM interpolymer, which is used in a dry form, without an oil extender. In a further embodiment, the polyene is a diene, and preferably is 5-ethylidene-2-norbornene (ENB).

In one embodiment, the interpolymer of Component A has a C2 (ethylene) content of from 45 to 95 weight percent, more preferably from 51 to 90 weight percent, and most preferably from 55 to 85 weight percent, based on the total weight of polymerized monomers.

In one embodiment, the nonconjugated polyene is a C6-C15 straight chain, branched chain or cyclic hydrocarbon diene. Illustrative nonconjugated dienes are straight chain acyclic dienes, such as 1,4-hexadiene and 1,5-heptadiene; branched chain acyclic dienes, such as 5-methyl-1,4-hexadiene, 2-methyl-1,5-hexadiene, 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene, 1,9-decadiene, and mixed isomers of dihydromyrcene; single ring alicyclic dienes such as 1,4-cyclohexadiene, 1,5-cyclooctadiene and 1,5-cyclododecadiene; multi-ring alicyclic fused and bridged ring dienes, such as tetrahydroindene, methyl tetrahydroindene; alkenyl, alkylidene, cycloalkenyl and cycloalkylidene norbornenes such as 5-methylene-2-norbornene (MNB), 5-ethylidene-2-norbornene (ENB), 5-vinyl-2-norbornene, 5-propenyl-2-norbornene, 5-isopropylidene-2-norbornene, 5-(4-cyclopentenyl)-2-norbornene, and 5-cyclohexylidene-2-norbornene. The diene is preferably a nonconjugated diene selected from the group consisting of ENB, dicyclopentadiene, 1,4-hexadiene, 7-methyl-1,6-octadiene, and preferably, ENB, dicyclopentadiene and 1,4-hexadiene, more preferably ENB and dicyclopentadiene, and even more preferably ENB.

Preferred interpolymers of the present invention have polymerized therein ethylene at least one α-olefin and 5-ethylidene-2-norbornene (ENB). The α-olefin is preferably a C3-C20 aliphatic compound, more preferably a C3-C12 aliphatic compound, and even more preferably a C3-C8 aliphatic compound. Preferred α-olefins include propylene, 1-butene, 1-pentene, 1-hexene, 3-methyl-1-pentene, 4-methyl-1-pentene, 1-heptene, 1-octene, 1-decene and 1-dodecene. More preferred α-olefins include propylene, 1-butene, 1-hexene and 1-octene, and most preferably propylene. In a preferred embodiment, the interpolymer has polymerized therein ethylene, propylene and 5-ethylidene-2-norbornene.

In general, polymerization may be accomplished at conditions well known in the art for Ziegler-Natta or Kaminsky-Sinn type polymerization reactions, that is, temperatures from 0° C. to 250° C., preferably 30° C. to 200° C., and pressures from atmospheric to 10,000 atmospheres. Polymerizations may also be conducted in accordance with processes disclosed in U.S. Pat. No. 6,680,361 (equivalent of International Publication No. WO 00/26268), fully incorporated herein by reference.

Polymerizations may be performed using a suspension, solution, slurry, or gas phase polymerization, or combinations thereof. In one embodiment, the polymerization is conducted in a solution loop reactor, or is conducted in a gas phase reactor. In another embodiment, a solution fed catalyst is used in a solution polymerization or in a gas phase polymerization. In another embodiment, the catalyst is supported on a support, such as, silica, alumina, or a polymer (especially poly (tetrafluoroethylene) or a polyolefin), and may be spray dried onto such supports, and introduced in supported form into a polymerization reactor.

The polymerization may take place in any suitable type of reactor, and preferably a reactor design that would allow one skilled in the art to determine catalyst efficiency. Reactors include, but are not limited to, batch reactors, continuous reactors, pilot plant reactors, a laboratory scale reactors, a high throughput polymerization reactors, and other types of commercial reactors.

Gas phase polymerizations are described in U.S. Pat. No. 5,264,506; U.S. Pat. No. 4,543,399; and European Patent EP 0089691B1; each is fully incorporated herein by reference. In one embodiment, the EAODM (preferably an EPDM) is polymerized in the gas phase in the presence of a partitioning agent (or filler). In a further embodiment, the partitioning agent is carbon black.

Inert liquids are suitable solvents for polymerizations, such as solution polymerizations. Examples include straight-chain and branched-chain hydrocarbons, such as isobutane, butane, pentane, hexane, heptane, octane, and mixtures thereof; cyclic and alicyclic hydrocarbons, such as cyclohexane, cycloheptane, methylcyclohexane, methylcycloheptane, and mixtures thereof; perfluorinated hydrocarbons, such as perfluorinated C4-C10 alkanes; and aromatic and alkyl-substituted aromatic compounds, such as benzene, toluene, xylene, and ethylbenzene. Suitable solvents also include liquid olefins that may act as monomers or comonomers including butadiene, cyclopentene, 1-hexene, 4-vinyl-cyclohexene, 3-methyl-1-pentene, 4-methyl-1-pentene, 1,4-hexadiene, 1-octene, 1-decene, styrene, divinylbenzene, allylbenzene, and vinyltoluene (including all isomers alone or in admixture). Mixtures of the foregoing are also suitable. If desired, normally gaseous olefins can be converted to liquids by application of pressure, and used herein.

Suitable catalysts for use herein, preferably include constrained geometry catalysts, as disclosed in U.S. Pat. Nos. 5,272,236 and 5,278,272, which are both incorporated herein, in their entirety, by reference. The monocyclopentadienyl transition metal olefin polymerization catalysts taught in U.S. Pat. No. 5,026,798, the teachings of which are incorporated herein by reference, are also suitable as catalysts of the invention.

The foregoing catalysts may be further described as comprising a metal coordination complex, comprising a metal of groups 3-10 or the Lanthanide series of the Periodic Table of the Elements, and a delocalized π-bonded moiety, substituted with a constrain-inducing moiety, said complex having a constrained geometry about the metal atom, such that the angle at the metal between the centroid of the delocalized, substituted π-bonded moiety, and the center of at least one remaining substituent, is less than such angle in a similar complex, containing a similar π-bonded moiety lacking in such constrain-inducing substituent. In addition, for such complexes comprising more than one delocalized, substituted x-bonded moiety, only one thereof, for each metal atom of the complex, is a cyclic, delocalized, substituted π-bonded moiety. The catalyst further comprises an activating cocatalyst.

Preferred catalyst complexes correspond to the Structure I:

Structure I

In Structure I, M is a metal of group 3-10, or the Lanthanide series of the Periodic Table of the Elements;

Cp* is a cyclopentadienyl or substituted cyclopentadienyl group bound in an η5 bonding mode to M;

Z is a moiety comprising boron, or a member of group 14 of the Periodic Table of the Elements, and optionally sulfur or oxygen, said moiety having up to 20 non-hydrogen atoms, and optionally Cp* and Z together form a fused ring system;

X independently each occurrence is an anionic ligand group or neutral Lewis base ligand group having up to 30 non-hydrogen atoms;

n is 0, 1, 2, 3, or 4 and is 2 less than the valence of M; and

Y is an anionic or nonanionic ligand group bonded to Z and M comprising nitrogen, phosphorus, oxygen or sulfur and having up to 20 non-hydrogen atoms, optionally Y and Z together form a fused ring system. More specific complexes are described in U.S. Pat. Nos. 5,272,236 and 5,278,272, incorporated herein by reference.

Specific compounds include: (tert-butylamido) (tetramethyl-η5-cyclopentadienyl)-1,2-ethanediylzirconium dichloride, (tert-butylamido)(tetramethyl-η5-cyclopentadienyl) 1,2-ethanediyltitanium dichloride, (methylamido)(tetramethyl-η5-cyclopentadienyl)-1,2-ethanediylzirconium dichloride, (methylamido) (tetramethyl-η5 cyclopentadienyl)-1,2-ethanediyltitanium dichloride, (ethylamido)(tetramethyl-η5-cyclopentadienyl)-methylenetitanium dichloro, (tertbutylamido)dibenzyl(tetramethyl-η5-cyclopentadienyl) silanezirconium dibenzyl, (benzylamido)dimethyl(tetramethyl-η5-cyclopentadienyl)silanetitanium dichloride, (phenylphosphido) dimethyl(tetramethyl η5-cyclopentadienyl)silanezirconium dibenzyl, (tertbutylamido) dimethyl(tetramethyl-η5-cyclopentadienyl)silanetitanium dimethyl, and the like.

The complexes may be prepared by contacting a derivative of a metal, M, and a group I metal derivative or Grignard derivative of the cyclopentadienyl compound, in a solvent, and separating the salt byproduct. Suitable solvents for use in preparing the metal complexes are aliphatic or aromatic liquids, such as cyclohexane, methylcyclohexane, pentane, hexane, heptane, tetrahydrofuran, diethyl ether, benzene, toluene, xylene, ethylbenzene, and the like, or mixtures thereof.

Suitable cocatalysts for use herein include polymeric or oligomeric aluminoxanes, especially methyl aluminoxane, as well as inert, compatible, noncoordinating, ion forming compounds. The so-called modified methyl aluminoxane (MMAO) is also suitable for use as a cocatalyst. One technique for preparing such modified aluminoxane is disclosed in U.S. Pat. No. 5,041,584, the teachings of which are incorporated herein by reference. Aluminoxanes can also be made, as disclosed in U.S. Pat. Nos. 4,544,762; 5,015,749; and 5,041,585, the entire content of each is incorporated herein by reference. Preferred cocatalysts are inert, noncoordinating, boron compounds, or aluminoxanes.

In addition to constrained geometry catalysts, additional single site catalyst systems that are suitable for use herein include metallocene catalyst systems and post metallocene catalyst systems.

Metallocene catalysts are, for example, coordination complexes between a transition metal, usually from group IV, in particular titanium, zirconium or hafnium, and two optionally substituted cyclopentadienyl ligands. These catalysts are used in combination with a co-catalyst, for example an aluminoxane, preferably methylaluminoxane, or a boron compound (see, for example, Adv. Organomet. Chem, Vol. 18, p. 99, 10 (1980); Adv. Organomet. Chem, Vol. 32, p. 325, (1991); J. M. S.-Rev. Macromol. Chem. Phys., Vol. C34(3), pp. 439-514, (1994); J. Organometallic Chemistry, Vol. 479, pp. 1-29, (1994); Angew. Chem. Int., Ed. Engl., Vol. 34, p. 1143, (1995) Prog. Polym. Sci., Vol. 20, p. 459 15 (1995); Adv. Polym. Sci., Vol. 127, p. 144, (1997); U.S. Pat. No. 5,229,478, or International applications WO 93/19107, EP 129 368, EP 277 003, EP 277 004, EP 632 065).

In one embodiment, the ethylene/α-olefin/nonconjugated polyene interpolymers of the invention are homogeneously branched linear (short chain branches) or homogeneously branched substantially linear interpolymers.

Examples of suitable interpolymers for use in the invention include NORDEL™ hydrocarbon rubbers available from The Dow Chemical Company.

In one embodiment of the invention, the ethylene/α-olefin/nonconjugated polyene interpolymer of Component A has a molecular weight distribution ($M_w/M_n$) from 1.1 to 3, more preferably from 1.2 to 3 and most preferably from 1.5 to 3. All individual values and subranges from 1.1 to 3 are included herein and disclosed herein. In a preferred embodiment, the interpolymer is an ethylene/propylene/diene interpolymer, and further an EPDM terpolymer.

In one embodiment, the ethylene/α-olefin/nonconjugated polyene interpolymer of Component A has a Mooney viscosity, ML(1+4) at 125° C., greater than 60, preferably greater than 70, more preferably greater than 80, even more preferably greater than 90, and most preferably greater than 100. In a preferred embodiment, the interpolymer is an ethylene/propylene/diene interpolymer, and further an EPDM terpolymer.

In one embodiment, the ethylene/α-olefin/nonconjugated polyene interpolymer of Component A has a Mooney viscosity, ML(1+4) @ 125° C., less than 300, preferably less than, or equal to, 240, more preferably less than, or equal to, 200, and even more preferably less than, or equal to, 160. In a preferred embodiment, the interpolymer is an ethylene/propylene/diene interpolymer, and further an EPDM terpolymer.

As discussed above, Mooney viscosity is that of the neat interpolymer (or calculated viscosity of neat polymer for polymers that contain a filler, such as carbon black, and/or an oil). The neat polymer refers to the polymer without filler and without oil.

In another embodiment, the ethylene/α-olefin/nonconjugated polyene interpolymer of Component A has a weight average molecular weight, ($M_w$) from 170,000 g/mole to 600,000 g/mole, more preferably from 180,000 g/mole to 500,000 g/mole, and most preferably from 185,000 g/mole to 400,000 g/mole. All individual values and subranges from 170,000 g/mole to 600,000 g/mole are included herein and disclosed herein. In a preferred embodiment, the interpolymer is an ethylene/propylene/diene interpolymer, and further an EPDM.

In another embodiment, each ethylene/α-olefin/nonconjugated polyene interpolymer is a homogeneously branched linear or homogeneously branched substantially linear ethylene/α-olefin/nonconjugated polyene interpolymer. In a preferred embodiment, the interpolymer is an ethylene/propylene/diene interpolymer, and further an EPDM terpolymer.

Processes for preparing homogeneous polymers are disclosed in U.S. Pat. No. 5,206,075; U.S. Pat. No. 5,241,031; and PCT International Publication Nos. WO 93/03093 and WO 90/03414; each of which is incorporated, herein, by reference in its entirety.

The terms "homogeneous" and "homogeneously-branched" are used in reference to an ethylene/α-olefin polymer (or interpolymer), in which the comonomer(s) is/are randomly distributed within a given polymer molecule, and all of the polymer molecules have the same or substantially the same comonomer(s)-to-ethylene ratio. The homogeneously branched ethylene interpolymers include linear ethylene interpolymers, and substantially linear ethylene interpolymers.

Included amongst the homogeneously branched linear ethylene interpolymers are ethylene interpolymers, which lack long chain branching (or measurable amounts of long chain branching), but do have short chain branches, derived from the comonomer(s) polymerized into the interpolymer, and which are homogeneously distributed, both within the same polymer chain, and between different polymer chains. That is, homogeneously branched linear ethylene interpolymers lack long chain branching, just as is the case for the linear low density polyethylene polymers or linear high density polyethylene polymers, made using uniform branching distribution polymerization processes, as described, for example, by Elston in U.S. Pat. No. 3,645,992.

Long chain branching can be determined by using 13C Nuclear Magnetic Resonance (NMR) spectroscopy, and can be quantified using the method of Randall (Rev. Macromol. Chem. Phys., C29 (2 &3), 1989, p. 285-297), the disclosure of which is incorporated herein by reference. Two other methods are gel permeation chromatography, couple with a low angle laser light scattering detector (GPCLALLS), and gel permeation chromatography, coupled with a differential viscometer detector (GPC-DV). The use of these techniques for long chain branch detection, and the underlying theories, have been well documented in the literature. See, for example, Zimm, B. H. and Stockmayer, W. H., J. Chem. Phys., 17, 1301 (1949) and Rudin, A., Modern Methods of Polymer Characterization, John Wiley & Sons, New York (1991) pp. 103-112.

Substantially linear ethylene interpolymers are described in U.S. Pat. Nos. 5,272,236 and 5,278,272; the entire contents of each are herein incorporated by reference. As discussed above, the substantially linear ethylene interpolymer is that in which the comonomer(s) is/are randomly distributed within a given interpolymer molecule, and all of the interpolymer molecules have the same or substantially the same comonomer(s) to ethylene ratio. Substantially linear ethylene interpolymers are prepared using a constrained geometry catalyst.

In U.S. Pat. No. 5,278,272, it was discovered that constrained geometry catalysts (CGC) have the ability to incorporate vinyl terminated macromonomers into the polymer backbone to form long chain branched (LCB) polymers. Such branching is referred to as T type branching. The amount of LCB that can be incorporated by these CGC is typically from 0.01 LCB/1000 carbon atoms to 3 LCB/1000 carbon atoms (both backbone and branched carbon atoms). The long chain branches have about the same comonomer distribution as the polymer backbone, and can have about the same length as the length of the polymer backbone. The carbon length of a long chain branch is longer than the carbon length of a short chain branch formed from the incorporation of one comonomer into the polymer backbone.

The substantially linear ethylene based interpolymers form a unique class of homogeneously branched ethylene polymers. They differ substantially from the well-known class of conventional, homogeneously branched linear ethylene based interpolymers, described by Elston in U.S. Pat. No. 3,645,992, and, moreover, they are not in the same class as conventional heterogeneous, "Ziegler-Natta catalyst polymerized" linear ethylene based polymers (for example, ultra low density polyethylene (ULDPE), linear low density polyethylene (LLDPE) or high density polyethylene (HDPE), made, for example, using the technique disclosed by Anderson et al., in U.S. Pat. No. 4,076,698); nor are they in the same class as high pressure, free-radical initiated, highly branched polyethylenes, such as, for example, low density polyethylene (LDPE), ethylene-acrylic acid (EAA) copolymers, and ethylene vinyl acetate (EVA) copolymers. An ethylene-based interpolymer comprises a majority molar amount of ethylene, based on the total amount of polymerized monomers.

An ethylene/α-olefin/nonconjugated polyene interpolymer may comprise a combination of two or more embodiments as described herein.

An ethylene/alpha-olefin/diene interpolymer may comprise a combination of two or more embodiments as described herein.

Additives

An inventive composition may comprise one or more additives. Suitable additives include, but are not limited to, fillers, antioxidants, UV stabilizers, vulcanizing agents, foaming agents, flame retardants, colorants or pigments, and combinations thereof.

Fillers for use as an additive in the invention include carbon black; silicates of aluminum, magnesium, calcium, sodium, potassium and mixtures thereof; carbonates of calcium, magnesium and mixtures thereof; oxides of silicon, calcium, zinc, iron, titanium, and aluminum; sulfates of calcium, barium, and lead; alumina trihydrate; magnesium hydroxide; phenol-formaldehyde, polystyrene, and poly(alphamethyl)-styrene resins, natural fibers, synthetic fibers, and the like.

Plasticizers employed as additives in the invention include petroleum oils, such as ASTM D2226 aromatic and naphthenic oils; polyalkylbenzene oils; organic acid monoesters, such as alkyl and alkoxyalkyl oleates and stearates; organic acid diesters, such as dialkyl, dialkoxyalkyl, and alkyl aryl phthalates, terephthalates, sebacates, adipates, and glutarates; glycol diesters, such as tri-, tetra-, and polyethylene glycol dialkanoates; trialkyl trimellitates; trialkyl, trialkoxyalkyl, alkyl diaryl, and triaryl phosphates; chlorinated paraffin oils; coumarone-indene resins; pine tars; vegetable oils, such as castor, tall, rapeseed, and soybean oils and esters and epoxidized derivatives thereof; and the like.

Antioxidants and antiozonants additives for use in the invention include hindered phenols, bisphenols, and thio-bisphenols; substituted hydroquinones; tris(alkylphenyl) phosphites; dialkylthiodipropionates; phenylnaphthylamines; substituted diphenylamines; dialkyl, alkyl aryl, and diaryl substituted p-phenylene diamines; monomeric and polymeric dihydroquinolines; 2-(4-hydroxy-3,5-t-butylaniline)-4,6-bis(octylthio)1,3,5-triazine, hexahydro-1,3,5-tris-β-(3,5-di-t-butyl-4-hydroxyphenyl)propionyl-s-triazine, 2,4,6-tris(n-1,4-dimethylpentylphenylene-diamino)-1,3,5-triazine, tris-(3,5-di-t-butyl-4-hydroxybenzyl)isocyanurate, nickel dibutyldithiocarbamate, 2-mercaptotolylimidazole and its zinc salt, petroleum waxes, and the like.

Foaming agents useful in making the resulting foam structure include, but are not limited to, decomposable chemical foaming agents. Such chemical foaming agents decompose at elevated temperatures to form gases or vapors to blow the polymer into foam form. The agent preferably takes a solid form, so it is conveniently dry-blended with the polymer material. Chemical blowing agents include, but are not limited to, azodicarbonamide, azodiisobutyro-nitrile, barium azodicarboxylate, N,N'-dimethyl-N,N'-dinitrosoterephthalamide, N,N'-dinitrosopentamethylenetetramine, benzenesulfonhydrazide, 4,4-oxybenzene sulfonyl semicarbazide, p-toluene sulfonyl semicarbazide, p,p'-oxybis-(benzenesulfonyl hydrazide), 3,3'-disulfonhydrazide-diphenylsulfone, azobisisobutyronitrile, azobisformamide and the like. In one embodiment, the blowing agent is azodicarbonamide. These foaming agents may be used alone or in admixture of two or more. In one embodiment, the foaming agent is an inorganic foaming agent, such as ammonium carbonate, sodium bicarbonate, anhydrous sodium nitrate and the like. Additional teachings related to chemical foaming agents are seen in C. P. Park, Supra, pp. 205-208, and F. A. Shutov, "Polyolefin Foam", Handbook of Polymer Foams and Technology, pp. 382-402, D. Klemper and K. C. Frisch, Hanser Publishers, Munich, Vienna, New York, Barcelona (1991), which is incorporated herein by reference.

In one embodiment, the chemical foaming agent is blended with the polymer material in an amount sufficient to evolve advantageously about 0.2 to about 5.0, preferably from about 0.5 to about 3.0, and most preferably from about 1.0 to 2.50 moles of gas or vapor per kilogram of polymer.

Other optional additives for use in the invention include activators (metal oxides such as zinc, calcium, magnesium, cadmium, and lead oxides; fatty acids such as stearic, lauric, oleic, behenic, and palmitic acids and zinc, copper, cadmium, and lead salts thereof; di-, tri-, and polyethylene glycols; and triethanolamine; accelerators (sulfenamides such as benzothiazoles, including bis-benzothiazoles, and thiocarbamyl sulfenamides, thiazoles, dithiocarbamates, dithiophosphates, thiurams, guanidines, xanthates, thioureas, and mixtures thereof); tackifiers (rosins and rosin acids, hydrocarbon resins, aromatic indene resins, phenolic methylene donor resins, phenolic thermosetting resins, resorcenol-formaldehyde resins, and alkyl phenol formaldehyde resins such as octylphenol-formaldehyde resin); homogenizing agents, peptizers, pigments, flame retardants, fungicides, and the like. The total amount of optional ingredients can range from about 40 to 800 parts by weight based upon 100 parts of the polymers in the composition.

Vulcanizing agents for use in the invention include, but are not limited to, sulfur-containing compounds, such as elemental sulfur, 4,4'-dithiodimorpholine, thiuram di- and polysulfides, alkylphenol disulfides, and 2-morpholino-dithiobenzothiazole; peroxides, such as di-tertbutyl peroxide, tertbutylcumyl peroxide, dicumyl peroxide, 2,5-dimethyl-2,5-di-(tertbutylperoxy) hexane, di-(tertbutylperoxyisopropyl) benzene, tertbutyl peroxybenzoate and 1,1-di-(tertbutylperoxy)-3,3,5-trimethylcyclohexane; metal oxides, such as zinc, magnesium, and lead oxides; dinitroso compounds, such as p-quinone-dioxime and p,p'-dibenzoylquinone-dioxime; and phenol-formaldehyde resins containing hydroxymethyl or halomethyl functional groups. The suitability of any of these vulcanizing agents for use in the invention will be largely governed by the choice of polymers, as is well known to those skilled in the compounding art.

In one embodiment of the invention, the sulfur containing compounds and the peroxides are the preferred vulcanizing agents, and the sulfur containing compounds are most preferred. It is understood that mixtures of these vulcanizing agents can be employed, though this is generally not preferred. The amount of the vulcanizing agent can range from about 1 to 10 parts by weight, based upon 100 parts of the polymers in the composition.

Sulfur can be a crystalline elemental sulfur or an amorphous elemental sulfur, and either type can be in pure form or supported on an inert carrier. An example of a supported sulfur is Rhenogran S-80 (80% S and 20% inert carrier) from Rhein Chemie.

Vulcanization temperatures and time employed are typical. Temperatures ranging from about 250° F. to about 440° F., and times ranging from about one minute to about 120 minutes can be employed.

In another embodiment, the composition contains a flame retardant, for example a metal hydrate, such as aluminum trihydroxide, magnesium dihydroxide, or combinations thereof. In a further embodiment, the flame retardant is a metal hydrate, and present in an amount between 25 weight percent and 75 weight percent, based on the total weight of the composition. In another embodiment, the surface of the metal hydroxide may be coated with one or more materials, including silanes, titanates, zirconates, carboxylic acids, and maleic anhydride-grafted polymers. In another embodiment, the average particle size of the metal hydrate may range from less than 0.1 micrometers to 50 micrometers. In some cases, it may be desirable to use a metal hydroxide having a nanoscale particle size. The metal hydroxide may be naturally occurring or synthetic. The composition may contain other flame-retardant additives. Other suitable non-halogenated flame retardant additives include calcium carbonated, I red phosphorus, silica, alumina, titanium oxides, talc, clay, organo-modified clay, zinc t borate, antimony trioxide, wollastonite, mica, magadiite, organo-modified magadiite, silicone polymers, phosphate esters, hindered amine stabilizers, ammonium octamolybdate, intumescent compounds, and expandable graphite. Suitable halogenated flame retardant additives include decabromodiphenyl oxide, decabromodiphenyl ethane, ethylene-big (tetrabromophthalimide), and 1,4,7,10-dimethanodibenzo(a,e)cyclooctene,1,2,3,4,7,8,9, 10,13,13,14,14-dodecachloro 1,4,4a,5,6,7,10,10a,11,12, 12a-dodecahydro-). A further description of such flame retardants is found in International Publication No. WO 2005/023924, fully incorporated herein by reference.

In another embodiment, the inventive compositions contain a compatibilizing amount of a flame retardant package, which includes a halogenated alkane flame retardant, an aromatic halogenated flame retardant, and optionally a flame retardant synergist. In a further embodiment, the alkane flame retardant is selected from hexahalocyclododecane; tetrabromocyclooctane; pentabromochlorocyclohexane; 1,2-dibromo-4-(1,2-dibromoethyl)cyclohexane; 1,1,1,3-tetrabromomononane; or a combination thereof. In another embodiment, the aromatic halogenated flame retardant comprises one or more of hexahalodiphenyl ethers; octahalodiphenyl ethers; decahalodiphenyl ethers; decahalobiphenyl ethanes; 1,2-bis(trihalophenoxy) ethanes; 1,2-bis(pentahalophenoxy) ethanes; a tetrahalobisphenol-A; ethylene(N,N')-bis-tetrahalophtlialimides; tetrabromobisphenol-A bis-(2,3-dibromopropyl ether); tetrahalophthalic anhydrides; hexahalobenzenes; halogenated indanes; halogenated phosphate esters; halogenated polystyrenes; polymers of halogenated bisphenol-A and epichlorohydrin; or a combination thereof. In yet another embodiment, the flame retardant synergist comprises one or more of a metal oxide, halogenated paraffin, triphenylphosphate, dimethyldiphenylbutane, polycumyl, or a combination thereof.

In another embodiment, the composition contains from about 0.5 to about 8 parts by weight halogenated alkane flame retardant; from about 0.5 to about 8 parts by weight aromatic halogenated flame retardant; from 0 to about 6 parts by weight flame retardant synergist, all based on the total weight of the composition. A further description of such flame retardants is found in International Publication No. WO 2002/12377, fully incorporated herein by reference.

The composition advantageously may further comprise at least one additive of the type conventionally added to polymers or polymer compositions. These additives include, for example, process oils; antioxidants; surface tension modifiers; UV stabilizers; scratch/mar additives, such as polydimethyl siloxane (PDMS) or functionalized polydimethyl siloxane or IRGASURF® SR 100 (available from Ciba Specialty Chemicals) or scratch mar formulations containing erucamide; anti-block agents; dispersants; blowing agents; linear or substantially linear EAOs; LDPE; LLDPE; lubricants; crosslinking agents such as peroxides; antimicrobial agents, such as organometallics, isothiazolones, organosulfurs and mercaptans; antioxidants, such as phenolics, secondary amines, phosphites and thioesters; antistatic agents, such as quaternary ammonium compounds, amines, and ethoxylated, propoxylated or glycerol compounds. Functionalized polydimethyl siloxanes include, but are not limited to, hydroxyl functionalized polydimethyl siloxane, amine functionalized polydimethyl siloxane, vinyl functionalized polydimethyl siloxane, aryl functionalized polydimethyl siloxane, alkyl functionalized polydimethyl siloxane, carboxyl functionalized polydimethyl siloxane, mercaptan functionalized polydimethyl siloxane, and derivatives of the same.

Additional additives include, but are not limited to, hydrolytic stabilizers; lubricants, such as fatty acids, fatty alcohols, esters, fatty amides, metallic stearates, paraffinic and microcrystalline waxes, silicones and orthophosphoric acid esters; mold release agents, such as fine-particle or powdered solids, soaps, waxes, silicones, polyglycols and complex esters, such as trimethylolpropane tristearate or pentaerythritol tetrastearate; pigments, dyes and colorants; plasticizers, such as esters of dibasic acids (or their anhydrides) with monohydric alcohols such as o-phthalates, adipates and benzoates; heat stabilizers, such as organotin mercaptides, an octyl ester of thioglycolic acid and a barium or cadmium carboxylate; ultraviolet light stabilizers used as a hindered amine, an o-hydroxy-phenylbenzotriazole, a 2-hydroxy, 4-alkoxyenzophenone, a salicylate, a cynoacrylate, a nickel chelate and a benzylidene malonate and oxalanilide; and zeolites, molecular sieves, anti-stat agents and other known deodorizers.

Additional additives include other polymers, including, but not limited to, ethylene-base polymers, and olefin multi-block interpolymers.

Suitable ethylene-base polymers include, but are not limited to, high density polyethylene (HDPE), linear low density polyethylene (LLDPE), very low density polyethylene (VLDPE), ultra low density polyethylene (ULDPE), homogeneously branched linear ethylene polymers, and homogeneously branched substantially linear ethylene polymers (that is homogeneously branched long chain branched ethylene polymers).

Some commercial examples of suitable ethylene-base interpolymers include commercially available HDPE, commercially available LDPE, ATTANE, AFFINITY, DOWLEX, FLEXOMER, ELITE, all available from The Dow Chemical Company; and EXCEED and EXACT available from Exxon Chemical Company.

The olefin multi-block interpolymers and their preparation and use, are described in WO 2005/090427, US2006/0199931, US2006/0199930, US2006/0199914, US2006/0199912, US2006/0199911, US2006/0199910, US2006/0199908, US2006/0199907, US2006/0199906, US2006/0199905, US2006/0199897, US2006/0199896, US2006/0199887, US2006/0199884, US2006/0199872, US2006/0199744, US2006/0199030, US2006/0199006 and US2006/0199983; each publication is fully incorporated herein by reference.

Olefin multi-block interpolymers may be made with two catalysts incorporating differing quantities of comonomer and a chain shuttling agent. Preferred olefin multi-block interpolymers are the ethylene/α-olefin multi-block interpolymers. An ethylene/α-olefin multi-block interpolymer has one or more of the following characteristics:

(1) an average block index greater than zero and up to about 1.0 and a molecular weight distribution, Mw/Mn, greater than about 1.3; or (2) at least one molecular fraction which elutes between 40° C. and 130° C. when fractionated using TREF, characterized in that the fraction has a block index of at least 0.5 and up to about 1; or (3) an Mw/Mn from about 1.7 to about 3.5, at least one melting point, Tm, in degrees Celsius, and a density, d, in grams/cubic centimeter, wherein the numerical values of $T_m$ and d correspond to the relationship:

$$T_m > -6553.3 + 13735(d) - 7051.7(d)^2; \text{ or}$$

(4) an Mw/Mn from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; or (5) an elastic recovery, Re, in percent at 300 percent strain and 1 cycle measured with a compression-molded coated substrate of the ethylene/α-olefin interpolymer, and has a density, d, in grams/cubic centimeter, wherein the numerical values of Re and d satisfy the following relationship when ethylene/α-olefin interpolymer is substantially free of a cross-linked phase: Re>1481-1629(d); or (6) a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or (7) a storage modulus at 25° C., G'(25° C.), and a storage modulus at 100° C., G'(100° C.), wherein the ratio of G'(25° C.) to G'(100° C.) is in the range of about 1:1 to about 9:1.

In a further embodiment, the ethylene/α-olefin multi-block interpolymers are ethylene/α-olefin multi-block copolymers made in a continuous, solution polymerization reactor, and which possess a most probable distribution of block lengths. In one embodiment, the copolymers contain 4 or more blocks or segments including terminal blocks.

The ethylene/α-olefin multi-block interpolymers typically comprise ethylene and one or more copolymerizable α-olefin comonomers in polymerized form, characterized by multiple blocks or segments of two or more polymerized monomer units differing in chemical or physical properties. That is, the ethylene/α-olefin interpolymers are block interpolymers, preferably multi-block interpolymers or copolymers. In some embodiments, the multi-block copolymer can be represented by the following formula:

$$(AB)_n$$

where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, the As and Bs are linked in a substantially linear fashion, as opposed to a substantially branched or substantially star-shaped fashion. In other embodiments, A blocks and B blocks are randomly distributed along the polymer chain. In other words, the block copolymers usually do not have a structure as follows.

AAA-AA-BBB-BB

In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

The ethylene multi-block interpolymers typically comprise various amounts of "hard" and "soft" segments. "Hard" segments refer to blocks of polymerized units in which ethylene is present in an amount greater than about 95 weight percent, and preferably greater than about 98 weight percent based on the weight of the polymer. In other words, the comonomer content (content of monomers other than ethylene) in the hard segments is less than about 5 weight percent, and preferably less than about 2 weight percent based on the weight of the polymer. In some embodiments, the hard segments comprise all or substantially all ethylene. "Soft" segments, on the other hand, refer to blocks of polymerized units in which the comonomer content (content of monomers other than ethylene) is greater than about 5 weight percent, preferably greater than about 8 weight percent, greater than about 10 weight percent, or greater than about 15 weight percent based on the weight of the polymer. In some embodiments, the comonomer content in the soft segments can be greater than about 20 weight percent, greater than about 25 weight percent, greater than about 30 weight percent, greater than about 35 weight percent, greater than about 40 weight percent, greater than about 45 weight percent, greater than about 50 weight percent, or greater than about 60 weight percent.

The soft segments can often be present in a block interpolymer from about 1 weight percent to about 99 weight percent of the total weight of the block interpolymer, preferably from about 5 weight percent to about 95 weight percent, from about 10 weight percent to about 90 weight percent, from about 15 weight percent to about 85 weight percent, from about 20 weight percent to about 80 weight percent, from about 25 weight percent to about 75 weight percent, from about 30 weight percent to about 70 weight percent, from about 35 weight percent to about 65 weight percent, from about 40 weight percent to about 60 weight percent, or from about 45 weight percent to about 55 weight percent of the total weight of the block interpolymer. Conversely, the hard segments can be present in similar ranges. The soft segment weight percentage and the hard segment weight percentage can be calculated based on data obtained from DSC or NMR. Such methods and calculations are disclosed in a concurrently filed U.S. patent application Ser. No. 11/376, 835 (insert when known), entitled "Ethylene/α-Olefin Block Interpolymers", filed on Mar. 15, 2006, in the name of Colin L. P. Shan, Lonnie Hazlitt, et. al., and assigned to Dow Global Technologies Inc., the disclosure of which is incorporated by reference herein in its entirety.

The term "multi-block copolymer" or "segmented copolymer" refers to a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In a preferred embodiment, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The multi-block copolymers are characterized by unique distributions of both polydispersity index (PDI or $M_w/M_n$), block length distribution, and/or block number distribution due to the unique process making of the copolymers. More specifically, when produced in a continuous process, the polymers desirably possess PDI from 1.7 to 2.9, preferably from 1.8 to 2.5, more preferably from 1.8 to 2.2, and most preferably from 1.8 to 2.1. When produced in a batch or semi-batch process, the polymers possess PDI from 1.0 to 2.9, preferably from 1.3 to 2.5, more preferably from 1.4 to 2.0, and most preferably from 1.4 to 1.8.

Applications

The compositions of the present invention may be used to prepare any of a variety of articles or manufacture, or their component parts or portions. The inventive compositions may be converted into a finished article of manufacture by any one of a number of conventional processes and apparatus. Illustrative processes include, but are not limited to, extrusion, calendering, injection molding, compression molding, and other typical thermoplastic processes. For example, articles can be prepared by injection molding, extrusion, extrusion followed by either male or female thermoforming, low pressure molding, compression molding and the like.

Articles include, but are not limited to, foams, sponges, belts, hoses, tubes, gaskets, membranes, molded goods, extruded parts, and adhesives. Additional articles includes polymer sheets, fibers coatings, automotive parts (for example, tires and tire components), computer parts, building materials, household appliances, electrical supply housings, trash cans, storage or packaging containers, lawn furniture strips or webbing, lawn mower, garden hose, and other garden appliance parts, refrigerator gaskets, acoustic systems, utility cart parts, desk edging, toys and water craft parts. The compositions can also be used in roofing applications, such as roofing membranes. The compositions can further be used in fabricating a footwear component, including, but not limited to, a shaft for a boot, particularly an industrial work boot. A skilled artisan can readily augment this list without undue experimentation.

DEFINITIONS

Any numerical range recited herein, includes all values from the lower value and the upper value, in increments of one unit, provided that there is a separation of at least two units between any lower value and any higher value. As an example, if it is stated that a compositional, physical or other property, such as, for example, molecular weight, melt index, etc., is from 100 to 1,000, it is intended that all individual values, such as 100, 101, 102, etc., and sub ranges, such as 100 to 144, 155 to 170, 797 to 1000, etc., are expressly enumerated in this specification. For ranges containing values which are less than one, or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this application. Numerical ranges have been recited, as discussed herein, in reference to density, Mooney viscosity, molecular weights, and other properties.

The term "composition," as used herein, includes a mixture of materials, which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer, usually employed to refer to polymers prepared from only one type of monomer, and the term interpolymer as defined hereinafter.

The term "interpolymer," as used herein, refers to polymers prepared by the polymerization of at least two different types of monomers. The generic term interpolymer thus includes copolymers, usually employed to refer to polymers prepared from two different types of monomers, and polymers prepared from more than two different types of monomers.

The terms "blend" or "polymer blend," as used herein, mean a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "phr," as used herein, is in reference to weight of a compositional component relative to hundred parts of the one or more ethylene/α-olefin/nonconjugated polyene interpolymers.

The term "parts," in reference to an amount of a component, refers to the weight parts of a component in a composition.

The term "granular particles," as used herein, refer to polymer particles in a friable form. This term does not refer to polymer in a bale form.

Measurements

Mooney Viscosity

Interpolymer MV (ML1+4 at 100° C.) is measured in accordance with ASTM 1646-04, with a one minute preheat time and a four minute rotor operation time. The instrument is an Alpha Technologies Rheometer MDR 2000.

Interpolymer MV (ML1+4 at 125° C.) is measured in accordance with ASTM 1646-04, with a one minute preheat time and a four minute rotor operation time. The instrument is an Alpha Technologies Rheometer MDR 2000.

For a carbon black filled EAODM (preferably an EPDM) interpolymer, the Mooney Viscosity [MV (ML1+4 at 125° C.)] for the neat interpolymer (no filler (for example, carbon black) and no oil) can be determined, by one skilled in the art, by one of two methods as described below. The following methods are in reference to carbon black filled interpolymers, however, one skilled in the art could use similar methods for other types of fillers. The following methods can also be modified by one skilled in the art to provide for the determination of Mooney viscosities at other temperatures and/or other test conditions, such as preheat time and/or rotor size.

Method 1

For a carbon black filled interpolymer (INTA), preferably with no oil, or a known amount of oil (typically less than two weight percent, based on weight of interpolymer), and which has a measured viscosity less than 100 [MV (ML1+4 at 125° C.)], the Mooney viscosity of the neat interpolymer is determined from a calibration curve as follows. The amount of carbon black in the polymerized INT A interpolymer can be determined gravimetrically, for example, by selective ashing of the polymer (plus additives if present), and, if present, oil, in a manner to leave the carbon black intact (for example TGA).

A neat interpolymer, corresponding in chemical make-up to the interpolymer of interest, and prepared from the same or similar catalyst system, and of known Mooney viscosity [MV (ML1+4 at 125° C.)], is melt blended with various levels of carbon black, and, if needed, the required amount of oil, to form a range of carbon black filled interpolymers. Melt blending can be done in a Brabender mixer. The carbon black and oil used, are the same as that in the interpolymer of interest (INT A). The Mooney viscosity [MV (ML1+4 at 125° C.)] is measured for each sample, and a calibration curve is generated, showing the measured Mooney viscosity as a function of the amount of carbon black. A series of such calibration curves are generated for several neat interpolymers (no filler, no oil) of varying viscosities. The data from the generated calibration curves is entered into a regression program, such as a MICROSOFT EXCEL regression program, and the following information is generated: a coefficient for the carbon black level, a coefficient for the measured Mooney viscosity, and an intercept.

The Mooney viscosity [MV (ML1+4 at 125° C.)] of the neat interpolymer of interest can be calculated using the data generated from the regression analysis, the known level of carbon black in the interpolymer (INTA), and the measured Mooney viscosity [MV (ML1+4 at 125° C.)] of the interpolymer (INT A).

Method 2

For a carbon black filled interpolymer (INT B), preferably with no oil, or a known amount of oil (typically less than two weight percent, based on the weight of the interpolymer) that has a viscosity that is determined to be greater than, or equal to, 100 [MV (ML1+4 at 125° C.)], the Mooney viscosity of the neat polymer is determined from a calibration curve as follows. The amount of carbon black in the polymerized INT B interpolymer can be determined gravimetrically, for example, by selective ashing of the polymer (plus additives if present), and, if present, oil, in a manner to leave the carbon black intact (for example TGA).

A neat interpolymer, corresponding in chemical make-up to the interpolymer of interest, and prepared from the same or similar catalyst system, and of known polymer Mooney viscosity, is melt blended, with a fixed amount of carbon black (for example, from 40 to 60 phr carbon black, based on hundred parts interpolymer), and a fixed amount of an oil (for example, from 60 to 80 phr oil, based on hundred parts interpolymer), to form a first sample. The carbon black and oil used, are the same as that in the interpolymer of interest (INTB). Additional samples are formed, each having an interpolymer of different Mooney viscosity, and each having the same amount of both carbon black and oil. The Mooney viscosity [MV (ML1+4 at 125° C.)] is measured for each sample. A calibration curve is generated, showing the measured Mooney viscosity [MV (ML1+4 at 125° C.)] as a function of the Mooney viscosity [MV (ML1+4 at 125° C.)] of the neat interpolymer (no filler, no oil).

The carbon-black filled interpolymer (INT B) of interest is next compounded with additional carbon black to achieve a final carbon black level as that used in the samples for calibration, as discussed above. Also the INT B interpolymer is compounded with the same oil, and at the same oil level, as that used in the samples for calibration as discussed above, to form a "new compounded INT B" interpolymer. The Mooney viscosity [MV (ML1+4 at 125° C.)] of the new compounded INT B interpolymer is measured. The Mooney viscosity of the neat interpolymer can be then calculated using the calibration curve as described above.

Polymer density is measured in accordance with ASTM D-792-00.

Gel Permeation Chromatography (GPC)

Polymer molecular weight was characterized by high temperature triple detector gel permeation chromatography (3D-GPC). The chromatographic system consisted of a Polymer Laboratories (Amherst, Mass., now part of Varian, Inc, Shropshire, UK) "PL-GPC 210" high temperature chromatograph, equipped with a concentration detector (RI), a Precision Detectors (Amherst, Mass.) 2-angle laser light scattering detector, Model 2040, and a 4-capillary differential viscometer detector, Model 220, from Viscotek (Houston, Tex.). The 15° angle of the light scattering detector was used for calculation purposes.

Data collection was performed using Viscotek TriSEC software version 3 and a 4-channel Viscotek Data Manager DM400. The system was equipped with an on-line ERC-3415α four channel degasser system from ERC Inc (Tokyo, JP). The carousel compartment was operated at 150° C. for polyethylene and 85° C. for EPDM, and the column compartment was operated at 150° C. The columns were four Polymer Lab Mix-A 30 cm, 20 micron columns. The polymer solutions are prepared 1,2,4-trichlorobenzene (TCB). The samples were prepared at a concentration of 0.1 grams of polymer in 50 ml of TCB. The chromatographic solvent and the sample preparation solvent contained 200 ppm of butylated hydroxytoluene (BHT). Both solvent sources were nitrogen purged. Polyethylene samples were stirred gently at 160° C. for 4 hours. EPDM samples were stirred gently at 160° C. for 1 hour. For carbon black containing samples, carbon black was removed by an one-time filtration that was performed at 150° C., under nitrogen pressurized flow through a pre-heated layer of Perlite in a ceramic filter. The injection volume was 200 μl, and the flow rate was 1.0 ml/minute.

Calibration of the GPC column set was performed with 21 narrow molecular weight distribution polystyrene standards. The molecular weights of the standards ranged from 580 to 8,400,000, and were arranged in 6 "cocktail" mixtures, with at least a decade of separation between individual molecular weights.

The polystyrene standard peak molecular weights were converted to polyethylene molecular weights using the following equation (as described in Williams and Ward, J. Polym. Sci., Polym. Let., 6, 621 (1968)):

$$M\text{polyethylene} = A \times (M\text{polystyrene})^B \quad (1A),$$

where M is the molecular weight, A has a value of 0.39 and B is equal to 1.0.

A fourth order polynomial was used to fit the respective polyethylene-equivalent calibration points.

The total plate count of the GPC column set was performed with Eicosane (prepared at 0.04 g in 50 milliliters of TCB, and dissolved for 20 minutes with gentle agitation.) The plate count and symmetry were measured on a 200 microliter injection according to the following equations:

$$\text{PlateCount} = 5.54 \times (RV \text{ at Peak Maximum}/(\text{Peak width at } \tfrac{1}{2} \text{ height}))^2 \quad (2A),$$

where RV is the retention volume in milliliters, and the peak width is in milliliters.

$$\text{Symmetry} = (\text{Rear peak width at one tenth height} - RV \text{ at Peak maximum})/(RV \text{ at Peak Maximum} - \text{Front peak width at one tenth height}) \quad (3A),$$

where RV is the retention volume in milliliters, and the peak width is in milliliters.

The Systematic Approach for the determination of multi-detector offsets was done in a manner consistent with that published by Balke, Mourey, et. Al (Mourey and Balke, Chromatography Polym. Chpt 12, (1992)) (Balke, Thitiratsakul, Lew, Cheung, Mourey, Chromatography Polym. Chpt 13, (1992)). Optimizing dual detector log molecular weight results from a broad polyethylene of 115,000 to the narrow standard column calibration results from the narrow standards calibration curve using in-house software. The molecular weight data for off-set determination was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, N.Y. (1987)). The overall injected concentration, used for the determination of the molecular weight, was obtained from the sample refractive index increment area, and the RI detector calibration from a linear polyethylene homopolymer of 115,000 Dalton molecular weight. The refractive index increment (dn/dc) for polyethylene is −0.104 mL/g and dn/dc for EODM is −0.094 mL/g. The chromatographic concentrations were assumed low enough to eliminate addressing 2nd Virial coefficient effects (concentration effects on molecular weight).

The calculations of Mn, Mw, and Mz based on GPC (conventional GPC for Mn, Mw and Mz) results using the RI detector were determined from the following equations:

$$\overline{Mn} = \frac{\sum_i RI_i}{\sum_i \left(\frac{RI_i}{M_{calibration_i}}\right)}, \quad (4A)$$

$$\overline{Mw} = \frac{\sum_i (RI_i * Mcal_i)}{\sum_i RI_i}, \text{ and} \quad (5A)$$

$$\overline{Mz} = \frac{\sum_i (RI_i * Mcal_i^2)}{\sum_i (RI_i * Mcal_i)}. \quad (6A)$$

The weight percent of polymer fraction with molecular weight $>10^6$ g/mole was calculated by determining the area fraction under the molecular weight distribution curve $>10^6$ g/mole. The molecular weight distribution curve was obtained from Conventional GPC measurements and equation (1A) above (where the total area of the molecular weight distribution curve is defined as 1).

In addition to the above calculations, a set of alternative values [Mw(abs), Mz(abs), Mz (BB) and $M_{z+1}$ (BB)] values were also calculated with the method proposed by Yau and Gillespie, Polymer, 42, 8947-8958 (2001), and determined from the following equations:

$$\overline{Mw}(abs) = K_{LS} * \frac{\sum_i (LS_i)}{\sum_i (IR_i)}, \quad (8A)$$

where, $K_{LS}$=LS-MW calibration constant, $$\overline{Mz}(abs) = \frac{\sum_i RI_i * (LS_i / RI_i)^2}{\sum_i RI_i * (LS_i / RI_i)}, \quad (9A)$$

$$\overline{Mz}(BB) = \frac{\sum_i (LS_i * Mcalibration_i)}{\sum_i (LS_i)}, \quad (10A)$$

$$\overline{M_{Z+1}}(BB) = \frac{\sum_i (LS_i * Mcalibration_i^2)}{\sum_i (LS_i * Mcalibration_i)}, \quad (11A)$$

where $LS_i$ is the 15 degree LS signal, and the Mcalibration uses equation 1A, and the LS detector alignment is as described previously.

In order to monitor the deviations over time, which may contain an elution component (caused by chromatographic changes) and a flow rate component (caused by pump changes), a late eluting narrow peak is generally used as a "flow rate marker peak." A flow rate marker was therefore established based on the air peak in TCB or a drop of decane flow marker dissolved in the eluting sample prepared in TCB. Flow rate marker was used to linearly correct the flow rate for all samples by alignment of the air peaks or decane peaks. Any changes in the time of the marker peak are then assumed to be related to a linear shift in both flow rate and chromatographic slope.

The preferred column set is of 20 micron particle size and "mixed" porosity to adequately separate the highest molecular weight fractions appropriate to the claims. The plate count for the chromatographic system (based on eicosane as discussed previously) should be greater than 22,000, and symmetry should be between 1.00 and 1.12.

Method for Determination of Non-Conjugated Polyenes in an Ethylene/α-Olefin/Polyene Interpolymer by NMR The ethylene and non-conjugated polyene contents of an interpolymer comprising ethylene, an α-olefin and a non-conjugated polyene can be determined by 13C or 1H Nuclear Magnetic Resonance (NMR) spectroscopy. For example, the 1H NMR spectra can be obtained via a Varian XL-400 NMR spectrometer, operating in Fourier Transform mode, with the following instrument conditions: pulse angle, 40°; acquisition time, 0.7 sec; pulse delay, 5.0 sec; spectral width, 12,000 Hz, and number of transient accumulated, 200. Samples are dissolved in deuterated chloroform, at room temperature, at a concentration of 1-2 weight percent, based on the total weight of the solution. For the determination of the ethylene content, the integrals of the methyl region (chemical shift delta versus tetramethysilane=0.88 ppm to 0.94 ppm) and the methylene region and methine region (delta=1.10 ppm to 1.54 ppm) can be employed. Similarly, if the α-olefin is propylene, the propylene content can also be determined from the resolved methyl spectral peak. The non-conjugated polyene content can be determined from the integral of the peak for the olefinic protons occurring at around 5 ppm, and the methylene, methyl and methine regions are corrected for the presence of the non-conjugated polyene units incorporated in the polymer. For example, when the diene is ENB, the diene content is determined from the integral of the peak for olefinic protons occurring at about 5.28 and 5.02 ppm (for cis- and trans-methine protons of =CH—CH3, respectively), and the methylene, methyl and methine regions are corrected for the presence of incorporated ENB. If the non-conjugated polyene is another kind, characteristic NMR spectral shift(s) can be resolved, and the integral of the chemical shift regions can be obtained. In addition, unincorporated non-conjugated polyene, if present, can be distinguished by the presence of vinyl protons. In this way, the proton analysis is capable of yielding unambiguous values for the contents of ethylene, α-olefin, such as propylene, and diene incorporated in the polymer.

Similarly, the content of the non-conjugated polyene an interpolymer comprising ethylene, an α-olefin and a non-conjugated polyene can also be determined using 13C NMR and other spectroscopic methods.

Additional spectroscopic methods are described in the following references, each fully incorporated herein by reference.

1. Yasuyuki Tanaka, Hisaya Sato, Yukio Ozeki, Masaru Ikeyama and Takefumi Sato, "Determination of unsaturation in ethylene-propylene terpolymers and butyl rubber by time-averaged 1H n.m.r. measurements", Polymer, 16(10) (1975), 709-713.
2. U.S. Pat. No. 5,229,478, "Process for production of high molecular weight EPDM elastomers using a metallocene-alumoxane catalyst system", Jul. 20, 1993 (http://www-.freepatentsonline.com/5229478.html).
3. W. Heinena, L. N. Ballijnsa, W. J. A. Wittenburga, R. Wintersa, J. Lugtenburga, M. van Duinb, "Synthesis and characterization of carbon-13 labelled 2-ethylidene-5-norbornene containing EPDM rubber. Observation of crosslinking and oxidation", Polymer 40 (1999) 4353-4363.
4. Harry J. A. Philipsen, "Determination of chemical composition distributions in synthetic polymers", Journal of Chromatography A, 1037 (2004) 329-350.
5. S. DiMartino and M. Kelchtermans, Determination of the composition of ethylene-propylene-rubbers using 13C-NMR spectroscopy, J. Appl. Poly. Sci. 56(13) (2003) 1781-1787.
6. Hayashi, T., Inoue, Y., Chujo, R., "Ethylene-Propylene Copolymerization Mechanism Based on the Sequence Distributions Determined by 13C NMR Spectra", Macromolecules 21 (1988) 3139-3146.

Method for Determination of Weight Percentage of ENB in an Ethylene/Propylene/ENB (EPDM) Terpolymer Using FTIR The weight percentage of 5-ethylidenenorbornene (ENB) can be determined using a Fourier Transform Infrared Spectroscopic (FTIR) method (for example, ASTM D65047-99). According to this ASTM D65047-99 method, the ENB content is determined from its infrared absorbance at 1681-1690 $cm^{-1}$, a measure of the ENB's exocyclic double bond. For EPDM catalyzed with a single site catalyst, the infrared absorbance band at about 1688 $cm^{-1}$ can be used. The absorbance of the EPDM interpolymer at 1688 $cm^{-1}$ is related to ENB mass fraction, and the mass fraction is determined by calibrating the instrument with known EPDM standards. The presence of oil and other components are first removed, such as by extraction, before the FTIR analysis. For oil-extended polymers, the oil can be removed using ASTM Method D 1416, section 67 through 74 and ASTM Method D 297.

The FTIR spectra were collected with 32 scans, at a resolution of 2 $cm^{-1}$. The spectra for the dry empty specimen compartment (Po) were first collected. The test sample was placed in the specimen compartment, and the dry atmosphere was re-established inside the specimen compartment. The single beam spectra (P) were collected, and the specimen absorbance (A) was calculated according to the following equation: $A = -\log 10(P/Po)$.

The calibration may be made using known standards covering the desired weight percent diene range, typically from 0 to 10 weight percent. The calibration may be based on primary standards for which the weight percent of ENB may be established via the use of primary methods, such as Nuclear Magnetic Resonance (NMR) methods.

The FTIR test specimen are prepared by pressing 0.20+/−0.05 grams of the polymer sample, placed between two Mylar sheets, using a platen press, heated at 125° C.+/−5° C., and a 4 MPa pressure, for 60+/−10 seconds. The pressed sheet is cooled to ambient temperature. A piece of the pressed film is cut into "15 mm by 50 mm" sized sample, and placed into the FTIR spectrophotometer sample holder window for spectral acquisition.

Additional spectroscopic methods are described in the following references, each fully incorporated herein by reference.

1. ASTM D 6047-99, "Standard Test Methods for Rubber, Raw—Determination of 5-Ethylidenenorbornene (ENB) or Dicyclopentadiene (DCPD) in Ethylene-Propylene-Diene (EPDM) Terpolymers", Annual Book of ASTM Standards, 1999 Issue.
2. J. M. Winter, M. S. Edmondson, D. R. Parikh, D. J. Mangold, and M. J. Castille, Jr. "Thermal and Spectroscopic (Vibrational and Nuclear Magnetic Resonance) Characterization of Ethylene-Propylene-Diene (EPDM) Elastomers", Presented at 152nd Fall Technical Meeting, Rubber Division, American Chemical Society, Cleveland, Ohio, Oct. 21-24, 1997. Paper No. 40.
3. S. DiMartino and M. Kelchtermans, Determination of the composition of ethylene-propylene-rubbers using 13C-NMR spectroscopy, J. Appl. Poly. Sci. 2003, 56 (13), 1781-1787.
4. Hayashi, T., Inoue, Y., Chujo, R., "Ethylene-Propylene Copolymerization Mechanism Based on the Sequence Distributions Determined by 13C NMR Spectra", Macromolecules 1988, 21, 3139-3146.
5. Ray, G. J., Johnson, P. E., Knox, J. R., "Carbon-13 Nuclear Magnetic Resonance Determination of Monomer Composition and Sequence Distributions in Ethylene-Propylene Copolymers Prepared with a Stereoregular Catalyst System', Macromolecules 1977, 10, 773-778.

MDR @ 180° C. were measured in accordance with ASTM D5289-95, using a RHEOLINE MDR, in conjunction with an HP Desktop Computer. The data was analyzed using LABLINE 2001 software (available from Prescott Instruments Ltd.). Sample size about 5-10 grams. Machine parameters: oscillating frequency of 1.67 Hz, oscillation amplitude of 0.5°, and temperature range 25° C.-250° C. Test run at 180° C., according to the ASTM procedure. The T10 and T90 were measured in accordance with ASTM D5289-95.

MDR @ 160° C. were measured in accordance with ASTM D5289-95, using a RHEOLINE MDR, in conjunction with an HP Desktop Computer. The data was analyzed using LABLINE 2001 software (available from Prescott Instruments Ltd.). Sample size about 5-10 grams. Machine parameters: oscillating frequency of 1.67 Hz, oscillation amplitude of 0.5°, and temperature range 25° C.-250° C. Test run at 180° C., according to the ASTM procedure. The T10 and T90 were measured in accordance with ASTM D5289-95.

The Mooney Scorch (125° C.) was measured in accordance with ASTM D1646-04, using a MOONEYLINE Viscometer, in conjunction with an HP Desktop Computer. The data was analyzed using LABLINE 2001 software. Sample size about 16 grams. Machine parameters: rotation speed of 2 RPM, and temperature range from room temp to 250° C. Test run at 125°

C., according to the ASTM procedure. The T5 and T30 were measured in accordance with ASTM D1646-04.

The following examples illustrate, but do not, either explicitly or by implication, limit the present invention.

EXPERIMENTAL

Sample polymers are shown in Table 1A below, and their molecular weight properties shown in Table 1B below. Example formulations are shown in Tables 2A and 2B below.

TABLE 1A

Polymers

| | Mooney Viscosity of Neat Polymer | ENB wt % | Et wt % |
|---|---|---|---|
| Comparative example KELTAN 4903 | 60 (1 + 8) 100° C. | 9.0 | 48 |
| NORDEL IP5565 | 65 (1 + 4) 125° C. | 7.5 | 50 |
| EPDM 6100 | 100 (1 + 4) 125° C. | 4.5 | 55 |
| EPDM 6140 | 140 (1 + 4) 125° C. | 4.9 | 58 |
| EPDM 7130 | 130 (1 + 4) 125° C. | 4.9 | 67 |
| EPDM 7100 | 100 (1 + 4) 125° C. | 4.9 | 73 |
| EPDM 7085 | 85 (1 + 4) 125° C. | 4.5 | 69.5 |

Neat polymer (no oil, no carbon black)

TABLE 1B

Analytical Properties of Polymers

| | KELTAN 4903 | EPDM 6100 | EPDM 6140 | EPDM 7130 | EPDM 7100 | EPDM 7085 | IP 5565 |
|---|---|---|---|---|---|---|---|
| $M_n$* | 69,630 | 75260 | 123960 | 66390 | 66730 | 92020 | 54090 |
| $M_w$* | 249720 | 186110 | 283520 | 242910 | 156910 | 230110 | 180240 |
| $M_z$* | 868400 | 374100 | 510400 | 577300 | 279600 | 451600 | 434100 |
| $M_w/M_n$ | 3.59 | 2.47 | 2.29 | 3.66 | 2.35 | 2.50 | 3.33 |
| $M_{z(abs)}/M_w$ | 4.54 | 2.02 | 2.11 | 2.90 | 1.96 | 2.05 | 2.60 |
| $M_{z(abs)}/M_{z(conv)}$ | 1.31 | 1.01 | 1.17 | 1.22 | 1.10 | 1.04 | 1.08 |

$M_{z(abs)}$ = The z-average molecular weight obtained via Laser Light Scattering (Equation 9A).
$M_n$, $M_w$ and $M_z$ = number-average molecular weight, weight-average molecular weight, and z-average molecular weight, respectfully, obtained via SEC GPC, using Equations 4A, 5A and 6A, respectively.
*SEC GPC

TABLE 2A

Formulations

| Samples | Example 1 (Comp.) | Example 2 (Comp.) | Example 3 | Example 4 | Example 5 |
|---|---|---|---|---|---|
| KELTAN 4903 (phr) | 100 | | | | |
| EPDM 6100 (phr) | | 100 | 70 | 40 | 65 |
| NORDEL IP5565 (phr) | | | 30 | 60 | 35 |
| Oil (phr) | 65 | 65 | 65 | 65 | 65 |
| CaCO3 (phr) | 30 | 40 | 40 | 40 | 40 |
| CB (phr) | 70 | 70 | 70 | 70 | 70 |
| Sulfur (phr) | 1.5 | 1.5 | 1.5 | 1.5 | 1.5 |
| ZnO (phr) | 5 | 5 | 5 | 5 | 5 |
| StH (stearic acid) (phr) | 1 | 1 | 1 | 1 | 1 |
| PEG (polyethylene glycol) phr | 1-3 | 1-3 | 1-3 | 1-3 | 1-3 |
| Foaming agent* (phr) | 2-4 | 2-4 | 2-4 | 2-4 | 2-4 |
| CaO (phr) | 4-7 | 4-7 | 4-7 | 4-7 | 4-7 |
| Accelerators** (phr) | 4-6 | 4-6 | 4-6 | 4-6 | 4-6 |
| Total ENB for EPDM (wt %) | 9 | 4.5 | 5.4 | 6.3 | 5.6 |

Weight (phr) relative to 100 parts rubber (two EPDM components = 100 parts)
*Examples of Foaming Agents: azodicarbonamide; 4,4'-oxybis-(benzenesulfonylhydrazide); N,N'-dinitrosopentametgylene
**Examples of Accelerators include the following: zinc dibutyl dithiocarbamate; zinc dimethyl dithiocarbamate; zinc diethyl dithiocarbamate; tetramethyl thiuram monosulfide; tetramethyl thiuram disulfide; tellurium diethyl dithiocarbamate; zinc ethyl phenl dithiocarbamate; 2-meraptobenzothiazole

TABLE 2B

Formulations

| Samples | Example 6 | Example 7 | Example 8 | Example 9 (comp.) |
|---|---|---|---|---|
| EPDM 7085 (g) | 15 | 30 | 65 | 100 |
| EPDM 6100 (g) | 50 | 35 | | |
| NORDEL IP5565 (g) | 35 | 35 | 35 | |
| Paraffin Oil (g) | 63 | 63 | 63 | 63 |
| CaCO$_3$ (g) | 30 | 30 | 30 | 30 |
| CB N550 (g) | 42 | 42 | 42 | 42 |
| CB N660 (g) | 18.2 | 18.2 | 18.2 | 18.2 |
| Sulfur (g) | 1.5 | 1.5 | 1.5 | 1.5 |
| ZnO (g) | 5 | 5 | 5 | 5 |
| Stearic acid (g) | 1 | 1 | 1 | 1 |
| Foaming agent - OBSH (p,p'-oxybisbenzenesulfonyl hydrazide) (g) | 2 | 2 | 2 | 2 |
| Foaming Agent AC (azodicarbonamide) (g) | 2 | 2 | 2 | 2 |
| ZDBC(BZ) (zinc dibutyl dithiocarbamate) (g) | 2 | 2 | 2 | 2 |
| ZDMC(PZ) (zinc dimethyl dithiocarbamate) (g) | 0.8 | 0.8 | 0.8 | 0.8 |
| MBT (2-merptobenzothiazole) (g) | 2 | 2 | 2 | 2 |

TABLE 2B-continued

Formulations

| Samples | Example 6 | Example 7 | Example 8 | Example 9 (comp.) |
|---|---|---|---|---|
| TMTD (tetramethyl thiuram disulfide) (g) | 0.8 | 0.8 | 0.8 | 0.8 |
| CaO (phr) | 8 | 8 | 8 | 8 |
| PEG (polyethylene glycol) (g) | 2.5 | 2.5 | 2.5 | 2.5 |
| Total ENB for EPDM (wt %) | 5.6 | 5.6 | 5.6 | 4.9 |

Each formulation was mixed as follows: EPDM, oil, CaCO3, carbon black, ZnO, PEG, and StH (stearic acid) were compounded using a Banbury mixer, at a mix speed of 40 RPM, to form a pre-blended formulation. After the temperature of the pre-blend reached 160° C., the compounding was terminated, and the pre-blended formulation was removed, and cooled in the air. Then the pre-blended formulation was compounded with the remaining components (sulfur, foaming agent(s), accelerator(s), and CaO), using a Banbury mixer, at a mix speed of 40 RPM, to form the final formulation. After temperature of the formulation reach 100° C., the compounding was terminated, and the final formulation was removed for extrusion or for cure property evaluation.

Extrusion

Each formulation (Examples 1-8) was transferred into a two roll mixer, and rolled into sheets (rolling process done at ambient conditions), and then cut into strips. The strips were typically stored under ambient conditions for one day.

The strips were transferred to an extruder (single screw, 90 mm screw diameter), and extruded at a temperature of about 50° C. (barrel temperature settings, three zones: 50° C., 50° C., 50° C.) (die temperature about 53° C.), at 10-25 RPM (extrudate line speed about 9-12 m/min). The extruded strip (profile) was conveyed into a curing oven (microwave oven, about 20-40 meters in length). Each strip was thermally treated at 220° C.-260° C., for 3-5 minutes, in air, to form a cured, foamed sample.

Cure Property Evaluation

The viscosity and cure properties of each final formulation are shown in Tables 3A and 3B. Each final formulation (in the form of a gum) was rolled into a sheet using the two roll mixer (rolling process done at ambient conditions), cut into strips, and stored under ambient conditions before testing. The strip was cut into a sample specimen for each test.

In Tables 3A and 3B, the rheometer acronyms are defined as follows: MDR=Moving Die Rheometer (about 5-10 grams of sample, RHEOLINE MDR). The MDR properties (MDR at 160° C. and 180° C.), and the Mooney viscosity (about 16 g sample, MOONEYLINE Viscometer) were each measured on the sample before the sample was subject to cure.

For the MDR measurements, each sample (about 5-10 g) was placed into a sample holder, and was thermally treated at a cure temperature at 160° C. or 180° C., for 30 minutes, in air. The T10 and T90 are the time necessary to reach the, 10% and 90%, respectively, of the difference between the minimum and the maximum of the torque (determined from the "torque versus time" curing curve).

The T5 and T30, in the Mooney Scorch measurements, are the time for the compound viscosity to increase 5 and 30 Mooney viscosity units from the minimum viscosity, respectively.

TABLE 3A

Rheology and Curing Results

| Sample # | Mooney Viscosity * ML (1 + 4) at 100° C., ASTM 1646-04 | Mooney Scorch at 125° C., ASTM 1646-04 | | MDR at 180° C., ASTM 5289-95 | | MDR at 160° C., ASTM 5289-95 | |
|---|---|---|---|---|---|---|---|
| | | T5 min. | T30, min. | T10 min. | T90 Min. | T10 Min. | T90 Min. |
| Comparative Example 1 | 45.78 | 5.16 | 7.09 | 0.29 | 3.91 | 0.63 | 10.52 |
| Comparative Example 2 | 49.18 | 5.41 | 7.43 | 0.29 | 6.19 | 0.53 | 17.84 |
| Inventive Example 3 | 56.24 | 6.13 | 8.40 | 0.33 | 3.66 | 0.6 | 8.59 |
| Inventive Example 4 | 62.06 | 5.41 | 7.44 | 0.29 | 3.26 | 0.40 | 10.16 |
| Inventive Example 5 | 56.42 | 5.26 | 7.32 | 0.32 | 4.75 | 0.6 | 8.92 |

* Mooney viscosity of the final formulation

TABLE 3B

Rheology and Curing Results

| Sample # | Mooney Viscosity* ML (1 + 4) at 100° C., ASTM 1646-04 | Mooney Scorch at 125° C., ASTM 1646-04 | | MDR at 160° C., ASTM 5289-95 | |
|---|---|---|---|---|---|
| | | T5 min. | T30, min. | T10 Min. | T90 Min. |
| Inventive Example 6 | 55.7 | 7.9 | 13.7 | 0.61 | 4.26 |
| Inventive Example 7 | 54.3 | 8.4 | 15.1 | 0.60 | 3.94 |
| Inventive Example 8 | 53.4 | 8.3 | 15.1 | 0.63 | 5 |
| Comparative Example 9 | | | | 0.75 | 11.49 |

*Mooney viscosity of final formulation

From Table 3A, it can be seen that the Mooney viscosities at 100° C. of Examples 3-5 are higher than that of Comparative Example 1. Examples 3-5 also showed scorch time (125° C.) comparable to, or longer (more desirable) than, the Comparative Example 1. The T90 values (MDR 180° C. and MDR 160° C.) for Examples 3-5 are shorter that that of Comparative Example 2. These shorter T90 times provide more uniform foam size and smoother foam surface.

The data in Table 3B show that Examples 6, 7, 8 showed higher Mooney viscosity at 100° C., and also longer scorch times at 125° C., as compared to Comparative Example 1. Examples 6, 7, 8 also showed shorter T90 (MDR at 160° C.) and T10 (MDR at 160° C.), as compared to those of Comparative Example 9. These shorter T10 times help to improve the collapse resistance of the rubber in foaming applications. The shorter T90 times provide more uniform foam size and smoother foam surface. Also, the higher Mooney viscosities of Examples 5-8 can prevent the adhesion between uncured extruded rubber and the transmission belt used for making weather-strip, and also provide a smoother foam surface.

Figure 1:
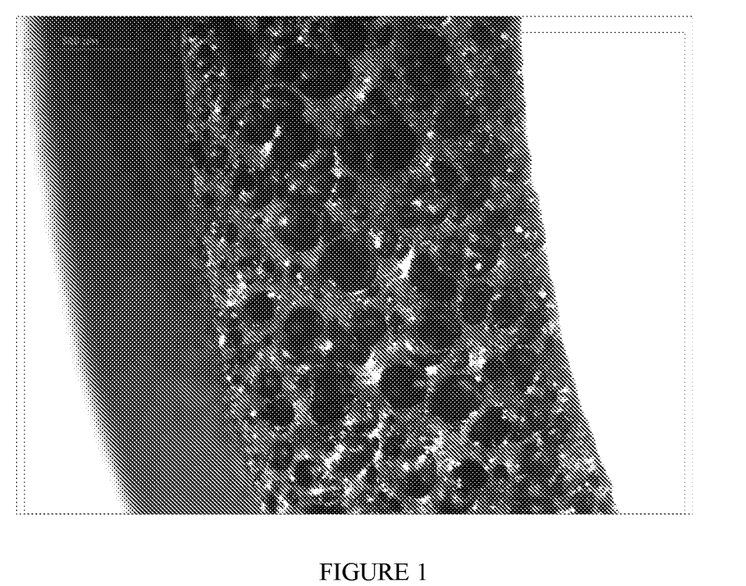
FIG. 1 depicts a sponge made from KELTAN 4903.
Figure 2:
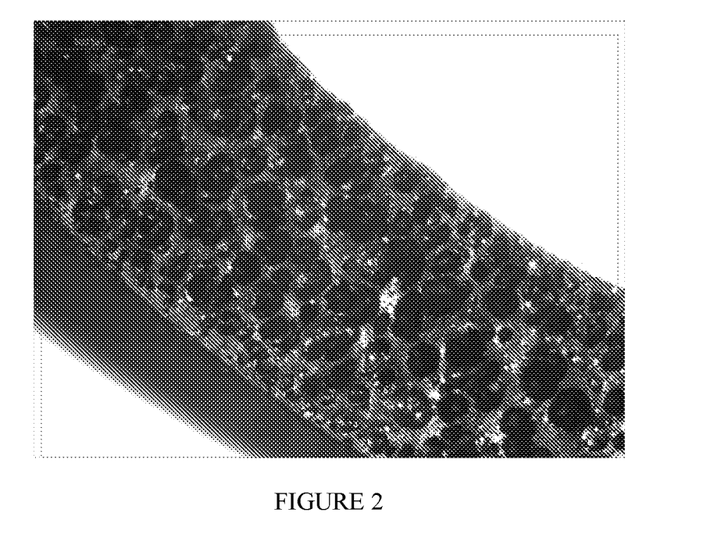
FIG. 2 depicts a sponge made from a 65/35 EPDM 6100/NORDEL IP5565 blend.

The morphology of the sponges made from Comparative Example 1 and Example 5 are shown in the FIGS. 1 and 2, respectively. From these figures, it can be seen that both examples produced foams having similar morphology. The blends of Examples 3-8 provide for good processing, while maintaining fast cure rates.

Additional Formulations

Three additional formulations (Examples 10-12) are shown below in Table 4. These formulations were used to prepare sponge. These samples were formulated as discussed above (see pages 44-45), and the cure properties of the final formations were determined as discussed above (see section on Cure Property Evaluation).

As shown in Table 4, the Mooney viscosity for each of Examples 10 and 11 is higher than that of Comparative Example 12. The higher viscosities of Examples 10 and 11 provide better processing properties, such as preventing the adhesion between uncured extruded rubber and transmission belt used for making weather-strip, and providing smoother foam surfaces. It can be seen that Examples 10 and 11 both have faster T10 values (MDR 180° C.), which means that these compositions can cure very quickly at the first curing stage. This faster cure will improve the collapse resistance of the rubber, which is very important in rubber foaming applications.

Although the invention has been described in certain detail through the preceding specific embodiments, this detail is for the primary purpose of illustration. Many variations and modifications can be made by one skilled in the art, without departing from the spirit and scope of the invention, as described in claim section below.

TABLE 4

Additional Formulations

|  | Ex. 10 | Ex. 11 | Ex. 12 (Comp.) |
|---|---|---|---|
| EPDM 6140 (g) | 64 | 64 |  |
| NORDEL IP5565 (g) | 50 | 50 | 100 |
| Stearic acid (g) | 2 | 2 | 2 |
| ZnO (g) | 5 | 5 | 5 |
| PEG (polyethylene glycol) (g) | 3 | 3 | 3 |
| CB N550 (g) | 56 | 56 | 56 |
| CaCO$_3$ (g) | 70 | 70 | 70 |
| Paraffin Oil (g) | 77 | 77 | 77 |
| PE Wax (g) | 3 | 3 | 3 |
| CaO (g) | 6 | 6 | 6 |
| Sulfur (g) | 1.5 | 1.5 | 1.5 |
| MBT (2-merptobenzothiazole) (g) | 2 | 2 | 2 |
| ZDBC(BZ) (zinc dibutyl dithiocarbamate) (g) | 2 | 2 | 2 |
| TMTD (tetramethyl thiuram disulfide) (g) | 0.8 | 0.8 | 0.8 |
| ZDMC(PZ) (zinc dimethyl dithiocarbamate) (g) | 0.8 | 0.8 | 0.8 |
| ZDEC (zinc diethyl dithiocarbamate) (g) | 0.5 | 0.5 | 0.5 |
| Foaming agent - OBSH (p,p'-oxybisbenzenesulfonyl hydrazide) (g) | 0.3 | 1.7 | 1.7 |
| Foaming Agent AC (azodicarbonamide) (g) | 1.7 | 0.5 | 0.5 |
| Total ENB for EPDM (wt %) | 6.7 | 6.7 | 7.5 |

TABLE 4-continued

Additional Formulations

|  | Ex. 10 | Ex. 11 | Ex. 12 (Comp.) |
|---|---|---|---|
| T5 (Min)* | 4.24 | 4.39 | 6.3 |
| T30 (Min)* | 5.42 | 6.01 | 8.2 |
| T10 (Min)** | 0.24 | 0.28 | 0.32 |
| T90 (Min)** | 5.12 | 7.31 | 3.13 |
| T10 (Min)*** | 0.41 | 0.51 | 0.46 |
| T90 (Min)*** | 8.72 | 11.46 | 7.01 |
| MV**** | 48 | 47.2 | 30.5 |

*Mooney Scorch at 125° C., ASTM 1646-04
**MDR at 180° C., ASTM 5289-95
***MDR at 160° C., ASTM 5289-95
****Mooney Viscosity ML(1 + 4) at 100° C., ASTM 1646-04

The invention claimed is:

1. A foam formed from a composition comprising at least the following:
    A) from "greater than zero" to "less than 100" phr (based on sum weight of Components A and B) of an interpolymer comprising, in polymerized form, ethylene, an α-olefin and a nonconjugated polyene, and wherein the interpolymer comprises less than, or equal to, 5 weight percent of the polyene, based on the total amount of polymerized monomers, and wherein the interpolymer has a molecular weight distribution (Mw/Mn) less than 3;
    B) from "less than 100" to "greater than zero" phr (based on sum weight of Components A and B) of an interpolymer comprising, in polymerized form, ethylene, an α-olefin and a nonconjugated polyene, and wherein the interpolymer comprises greater than, or equal to, 5 weight percent of the polyene, based on the total amount of polymerized monomer; and
    wherein the total polyene content is less than 7 weight percent (based on the total amount of polymerized monomers in the interpolymers of Components A and B), and
    wherein the weight ratio of the polyenes in the interpolymers of Components A and B (polyene(A)/polyene(B)) is less than, or equal to, 0.8.

2. The foam of claim 1, wherein the interpolymer of Component B comprises from 5 to 8 weight percent of the polyene.

3. The foam of claim 1, wherein the interpolymer of Component B comprises greater than, or equal to, 7 weight percent of the polyene.

4. The foam of claim 1, wherein the interpolymer of Component A comprises less than 5 weight percent of the polyene.

5. The foam of claim 1, wherein the interpolymer of Component A has a molecular weight distribution, Mw/Mn, less than 2.9.

6. The foam of claim 1, wherein the interpolymer of Component A has a branching index ratio, Mz(abs)/Mz, less than, or equal to, 1.4.

7. The foam of claim 1, wherein the interpolymer of Component A has a molecular weight ratio, Mz(abs)/Mw, less than, or equal to, 3.1.

8. The foam of claim 1, wherein the interpolymer of Component B has a branching index ratio, Mz(abs)/Mz, less than, or equal to, 1.5.

9. The foam of claim 1, wherein the interpolymer of Component A comprises greater than 2 weight percent of the polyene, based on the total weight of polymerized monomers.

10. The foam of claim 1, wherein the interpolymer of Component B comprises less than 7.5 weight percent of the polyene.

11. The foam of claim 1, wherein the weight ratio of ethylene to α-olefin in the interpolymer of Component A is less than 2.5.

12. The foam of claim 11, wherein the weight ratio of ethylene to α-olefin in the interpolymer of Component B is less than 2.5.

13. An article, comprising at least one component formed from the foam of claim 1.

14. A method of making a polymeric foam, said method comprising foaming and crosslinking the foam of claim 1.

15. The foam of claim 1, wherein the ethylene/α-olefin/nonconjugated polyene interpolymer of Component A has a Mooney viscosity, ML(1+4) at 125° C., greater than 60.

\* \* \* \* \*